(12) United States Patent
Kawamura et al.

(10) Patent No.: US 10,620,398 B2
(45) Date of Patent: Apr. 14, 2020

(54) IMAGING LENS HAVING A HIGH MAXIMUM IMAGING MAGNIFICATION AND A SMALL F NUMBER AND IMAGING APPARATUS

(71) Applicant: FUJIFILM Corporation, Tokyo (JP)

(72) Inventors: Daiki Kawamura, Saitama (JP); Tetsuya Ori, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 142 days.

(21) Appl. No.: 15/822,592

(22) Filed: Nov. 27, 2017

(65) Prior Publication Data

US 2018/0164540 A1 Jun. 14, 2018

(30) Foreign Application Priority Data

Dec. 12, 2016 (JP) .................. 2016-240060

(51) Int. Cl.
*G02B 27/64* (2006.01)
*G02B 7/10* (2006.01)
(Continued)

(52) U.S. Cl.
CPC ................ *G02B 7/10* (2013.01); *G02B 9/64* (2013.01); *G02B 15/163* (2013.01); *G02B 15/17* (2013.01); *G02B 15/22* (2013.01); *G02B 27/646* (2013.01)

(58) Field of Classification Search
CPC .... G02B 27/64; G02B 27/646; G02B 13/001; G02B 13/0015; G02B 13/0035;
(Continued)

(56) References Cited

U.S. PATENT DOCUMENTS 4,793,698 A 12/1988 Hirano
6,359,739 B1 * 3/2002 Sensui ................ G02B 9/34
359/754
(Continued)

FOREIGN PATENT DOCUMENTS

JP S62-231918 A 10/1987
JP H03-225309 A 10/1991
(Continued)

OTHER PUBLICATIONS

An Office Action mailed by the Japanese Patent Office dated Jan. 28, 2020, which corresponds to Japanese Patent Application No. 2016-240060 and is related to U.S. Appl. No. 15/822,592; with English language translation.

*Primary Examiner* — Arnel C Lavarias
(74) *Attorney, Agent, or Firm* — Studebaker & Brackett PC

(57) ABSTRACT

The imaging lens consists of, in order from the object side, a first lens group having a positive refractive power, a second lens group, and a third lens group. In the second lens group, a first focus lens group having a negative refractive power is disposed to be closest to the object side, and a second focus lens group having a positive refractive power is disposed to be closest to the image side. During focusing, only the first and second focus lens groups move by changing the mutual spacing therebetween. The first lens group has two positive lenses and one negative lens. The first focus lens group consists of two or less lenses including a negative lens. Predetermined conditional expressions are satisfied.

20 Claims, 25 Drawing Sheets

(51) Int. Cl.
*G02B 9/64* (2006.01)
*G02B 15/163* (2006.01)
*G02B 15/17* (2006.01)
*G02B 15/22* (2006.01)

(58) Field of Classification Search
CPC ...... G02B 13/004; G02B 15/00; G02B 15/14; G02B 15/15; G02B 15/16; G02B 15/163; G02B 15/167; G02B 15/17; G02B 15/20; G02B 15/22; G02B 15/24; G02B 15/26; G02B 9/00; G02B 9/12; G02B 9/34; H04N 5/23248; H04N 5/23264; H04N 5/2328; H04N 5/23287
USPC ....... 359/554, 557, 676, 683, 684, 685, 686, 359/689, 754, 771, 772, 773, 784, 791; 250/201.1, 201.2, 201.4; 348/208.99, 348/208.2, 208.12; 396/52, 55
See application file for complete search history.

(56) References Cited

U.S. PATENT DOCUMENTS

| 8,964,302 | B2* | 2/2015 | Kawamura | G02B 15/14 |
| | | | | 359/676 |
| 2010/0284092 | A1 | 11/2010 | Hayakawa | |
| 2014/0184887 | A1 | 7/2014 | Yonetani et al. | |
| 2014/0334014 | A1 | 11/2014 | Matsui | |
| 2017/0293121 | A1* | 10/2017 | Kawamura | G02B 15/16 |

FOREIGN PATENT DOCUMENTS

| JP | H04-110811 A | 4/1992 |
| JP | 2001-021798 A | 1/2001 |
| JP | 2009-180844 A | 8/2009 |
| JP | 2014-006487 A | 1/2014 |
| JP | 2014-142601 A | 8/2014 |
| JP | 2014-219601 A | 11/2014 |
| JP | 2016-139125 A | 8/2016 |

* cited by examiner

FIG. 1
EXAMPLE 1
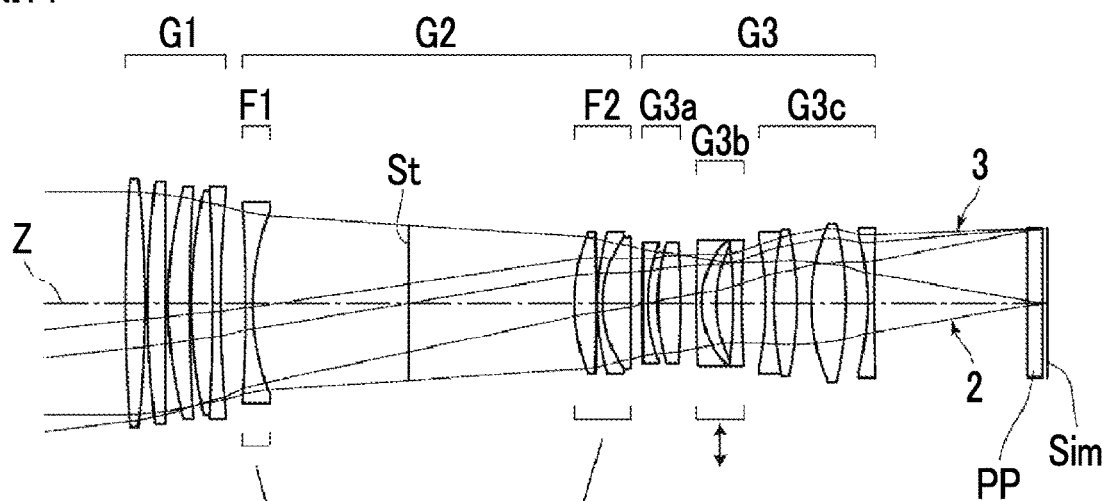
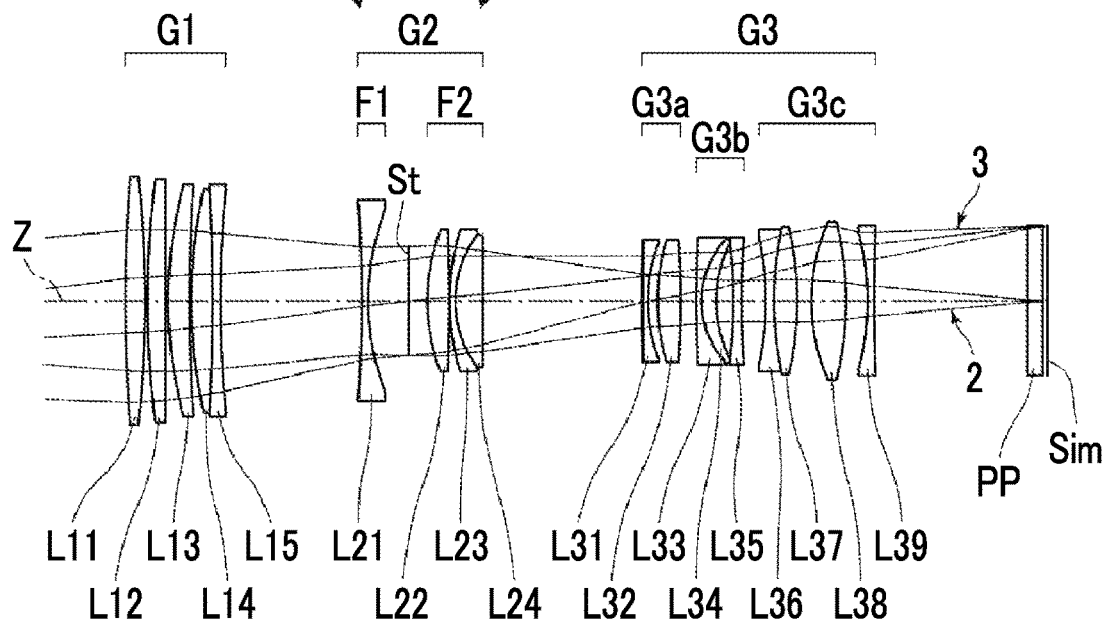

FIG. 2
EXAMPLE 2
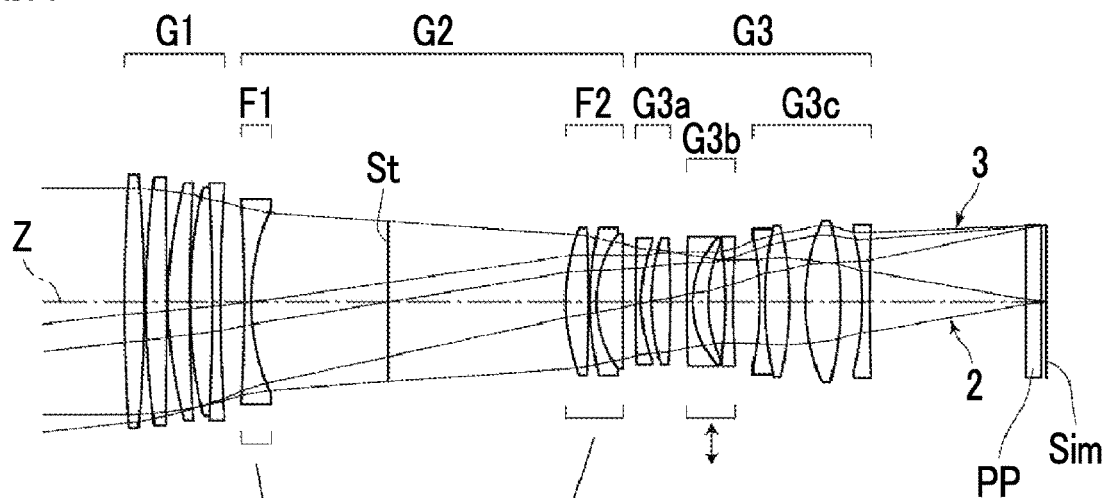
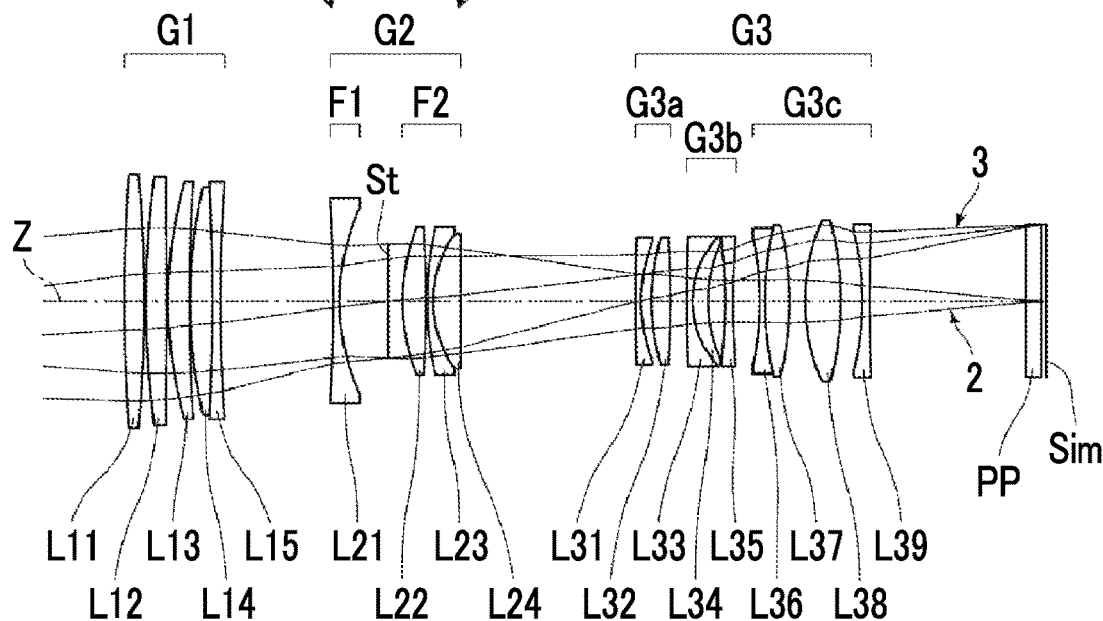

FIG. 3
EXAMPLE 3
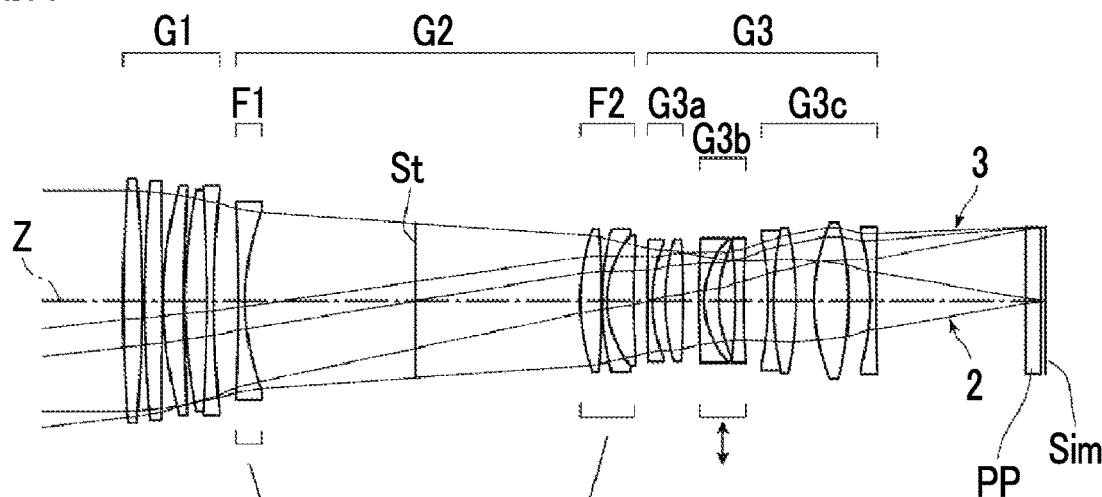
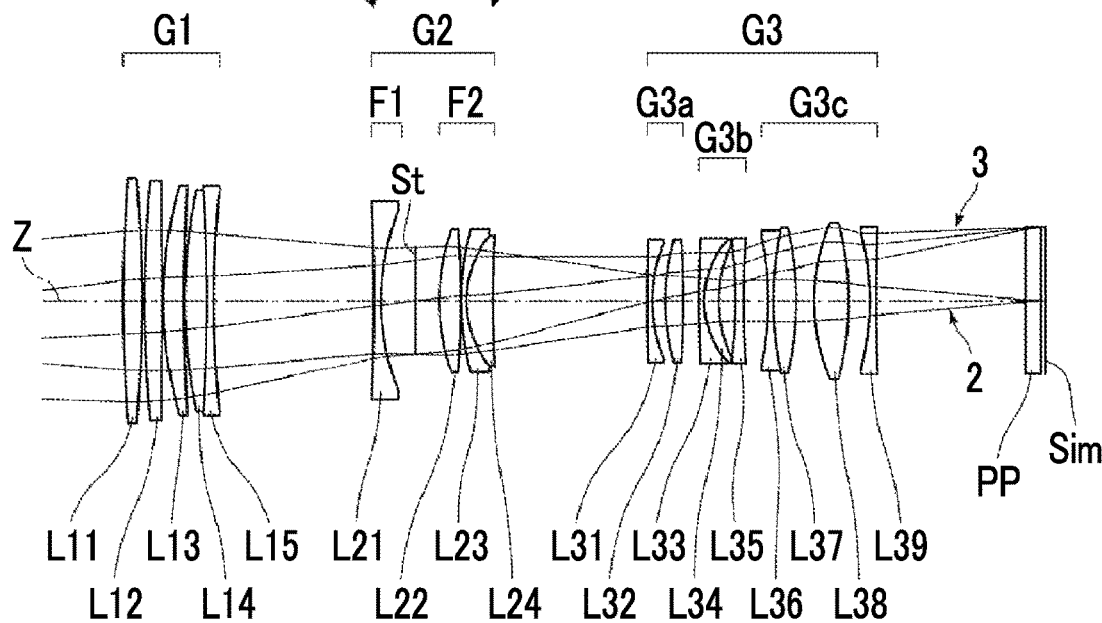

FIG. 4
EXAMPLE 4
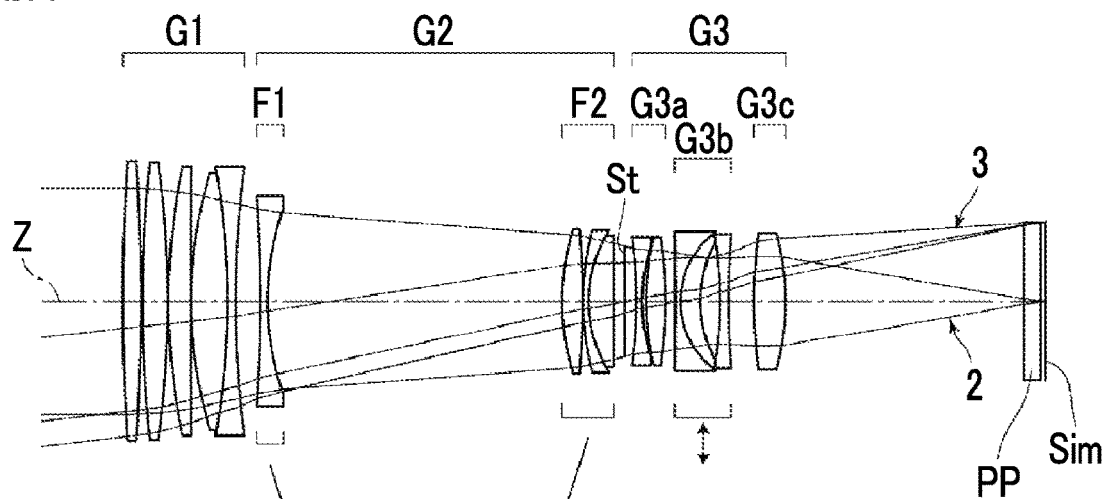
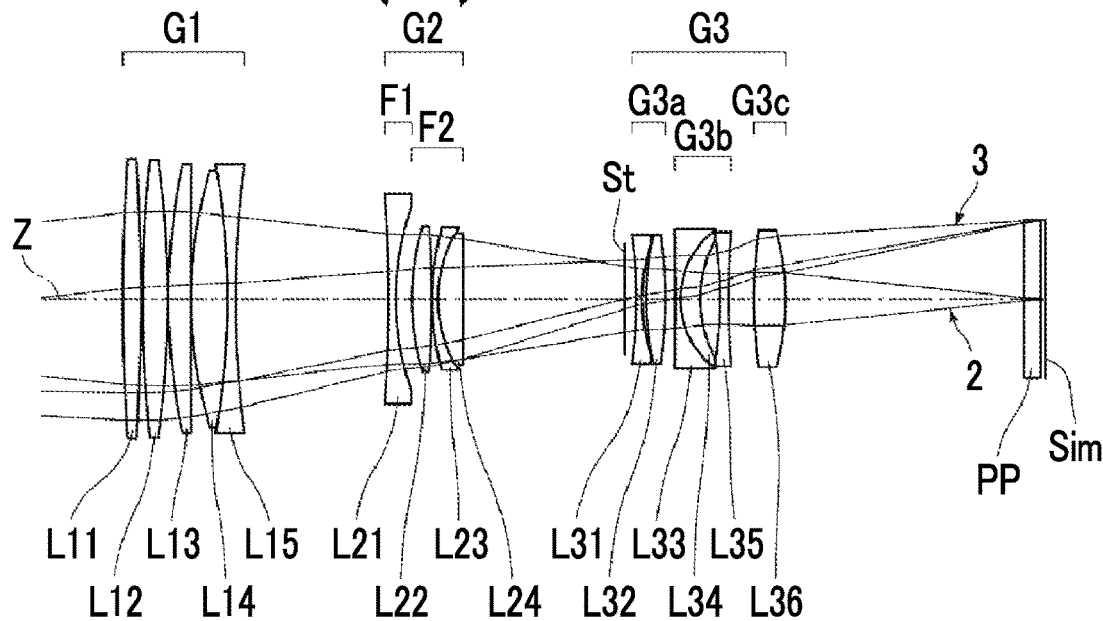

FIG. 5
EXAMPLE 5
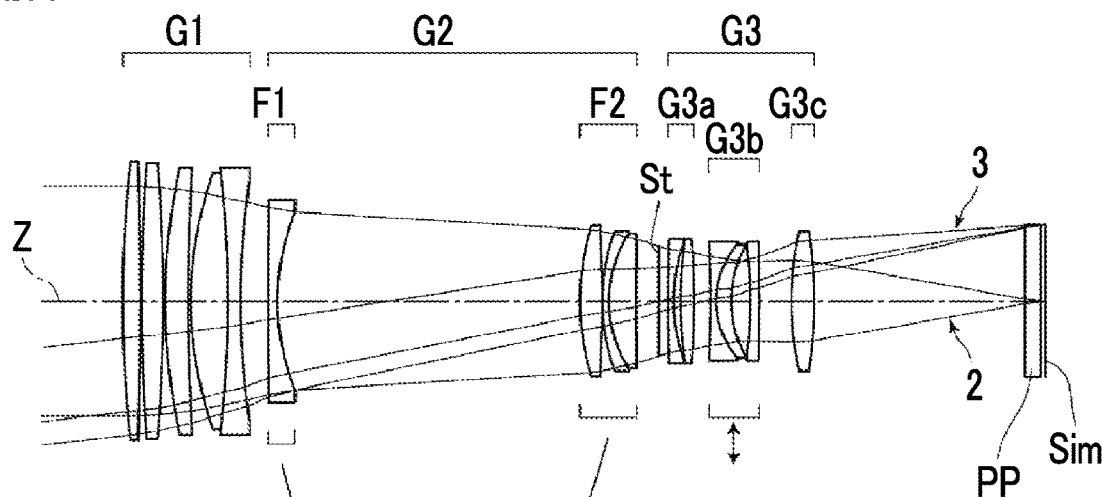
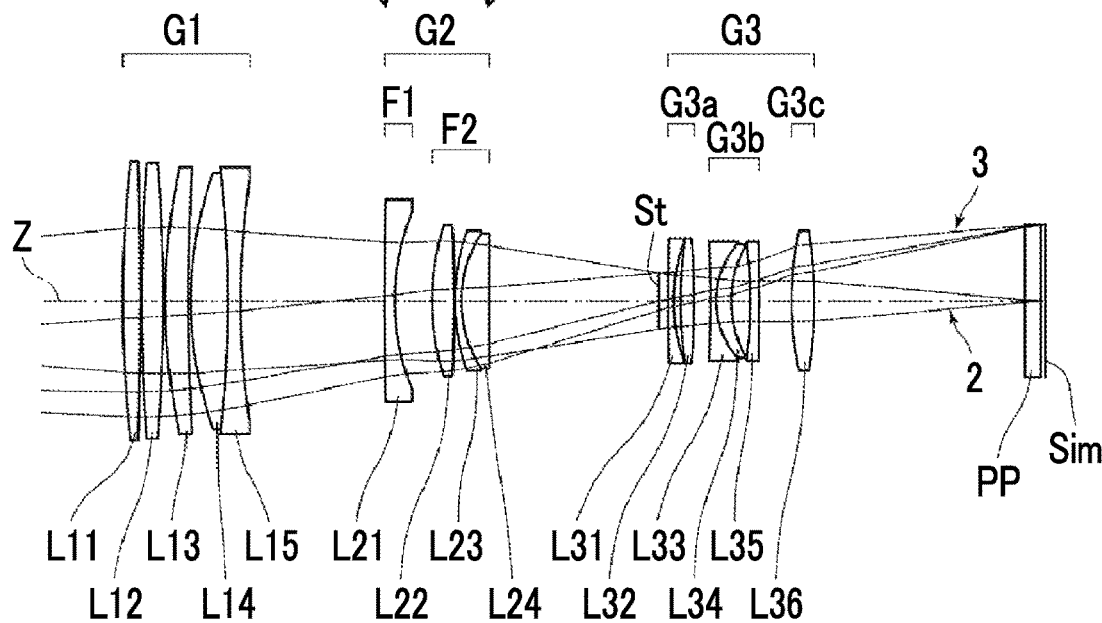

FIG. 6
EXAMPLE 6
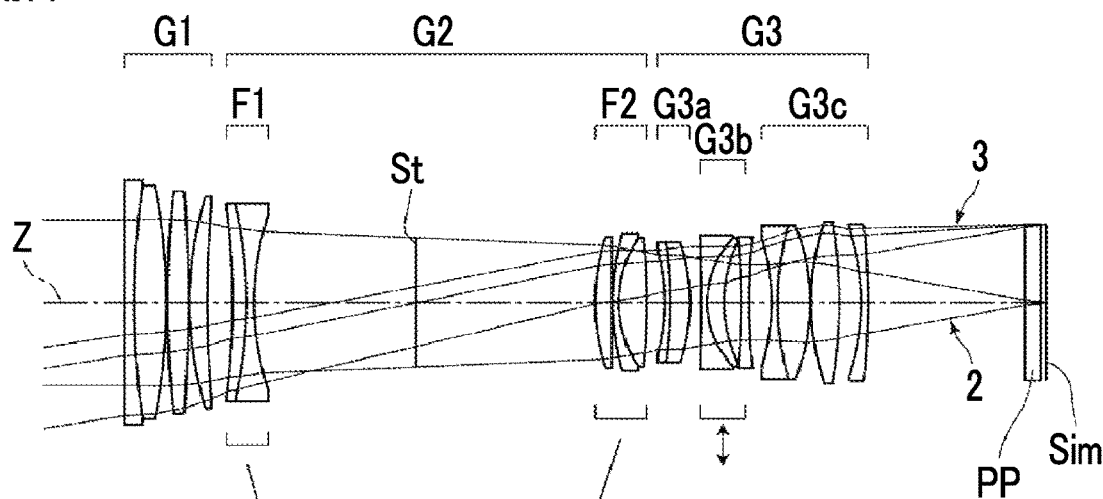
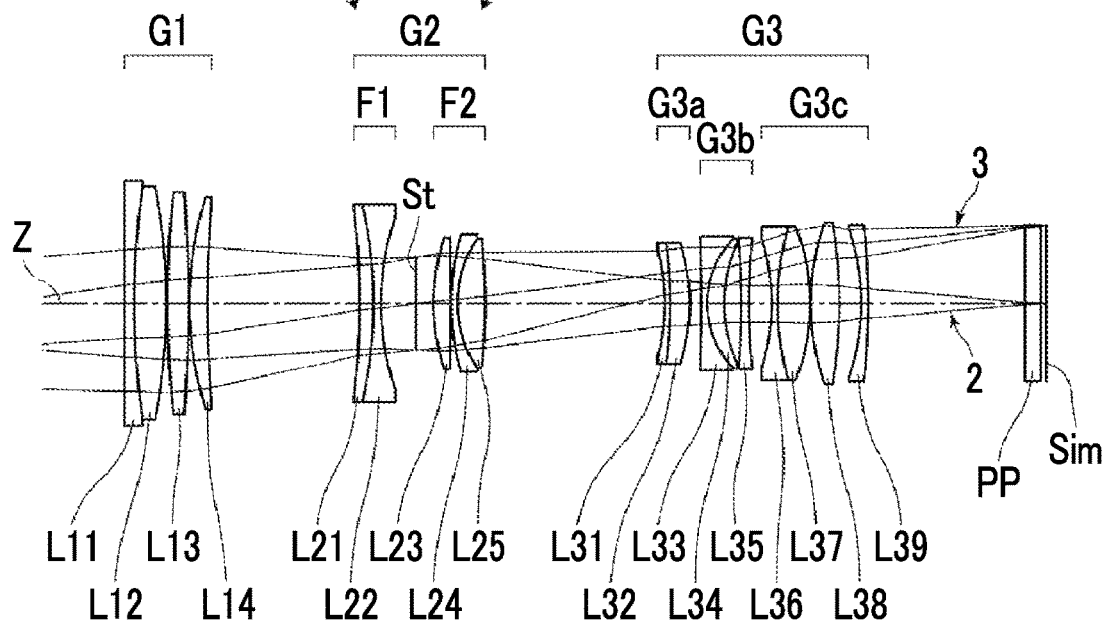

FIG. 7
EXAMPLE 7
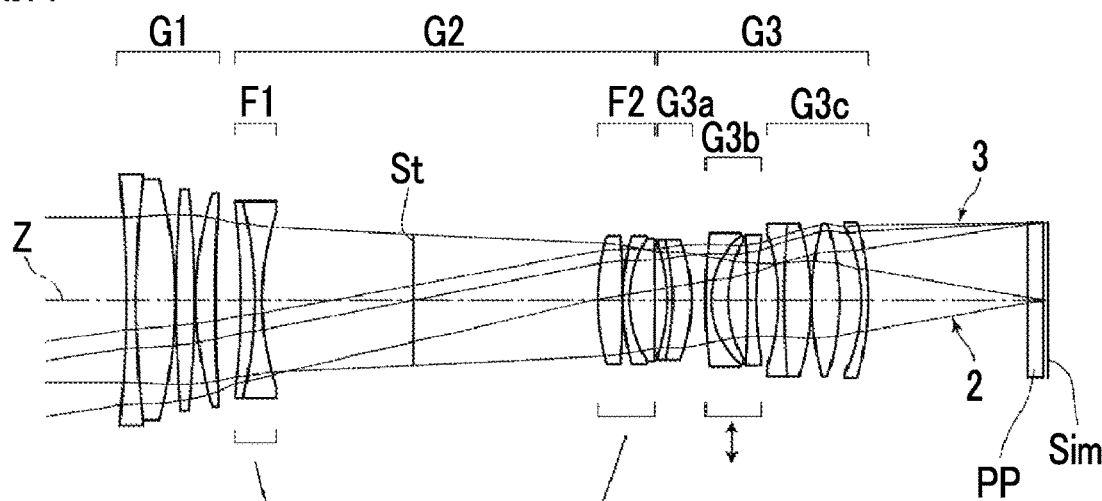
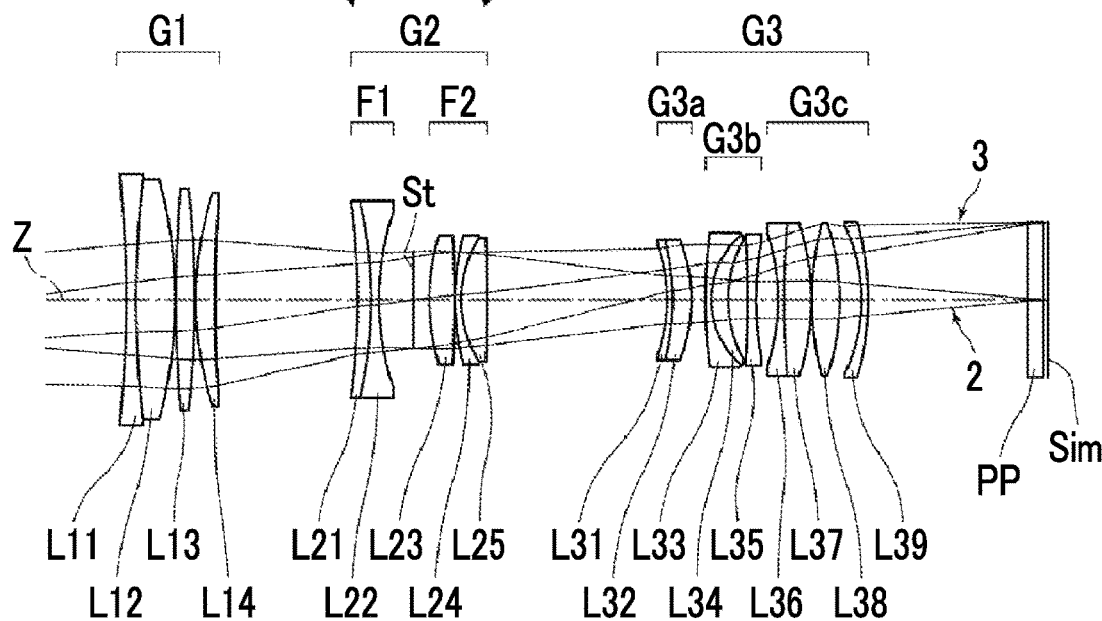

FIG. 8
EXAMPLE 8
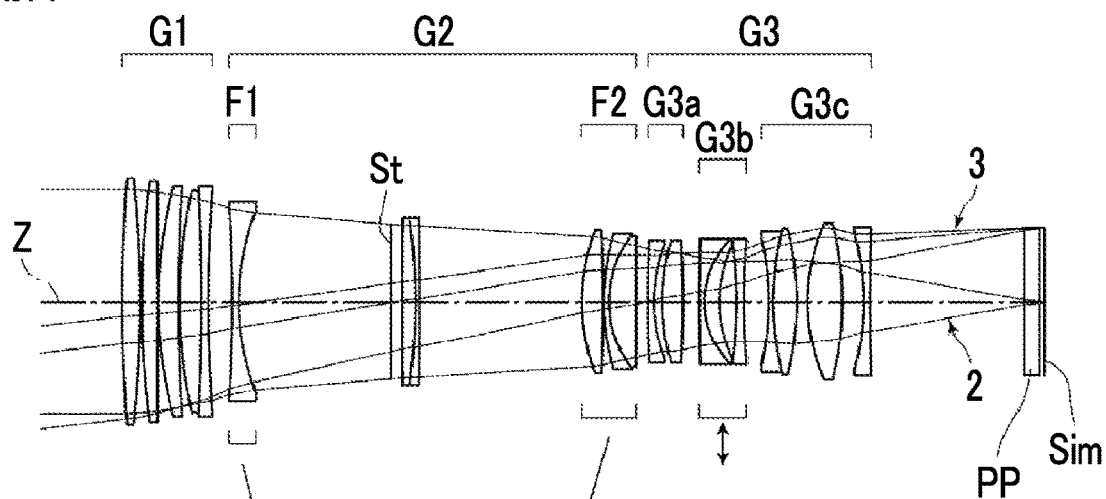
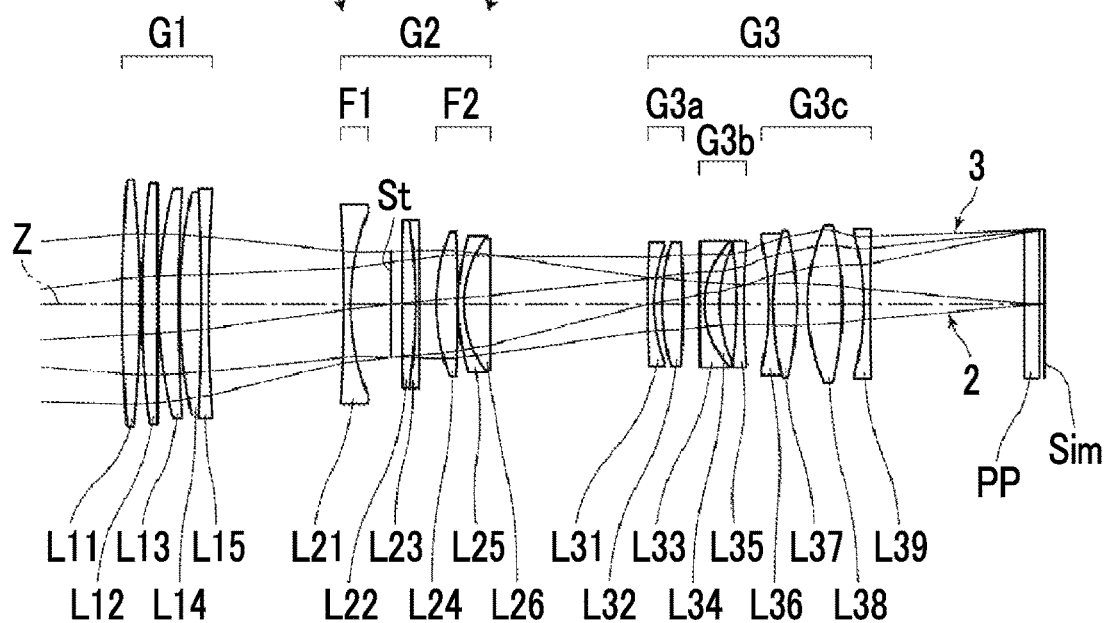

FIG. 17
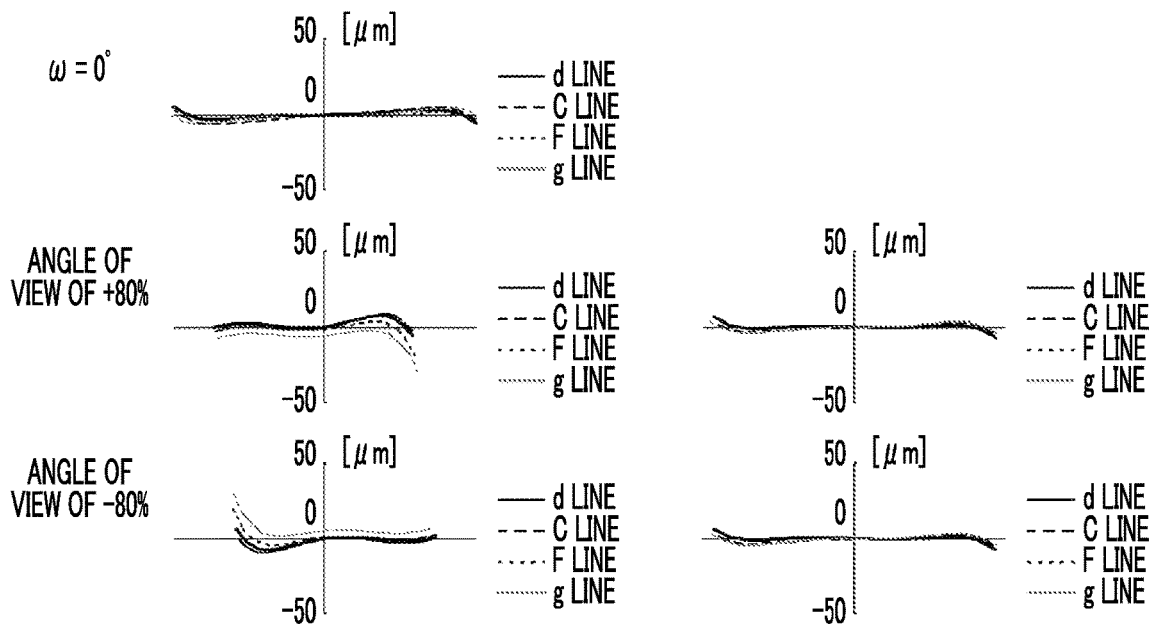
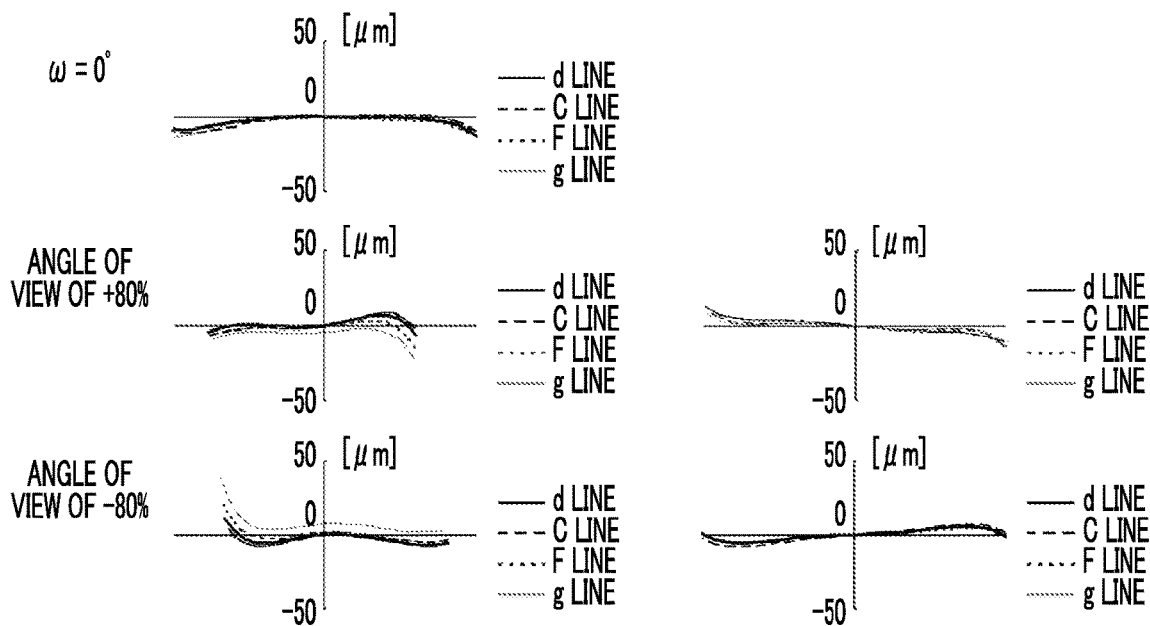

FIG. 18
EXAMPLE 2
NO IMAGE BLUR CORRECTION
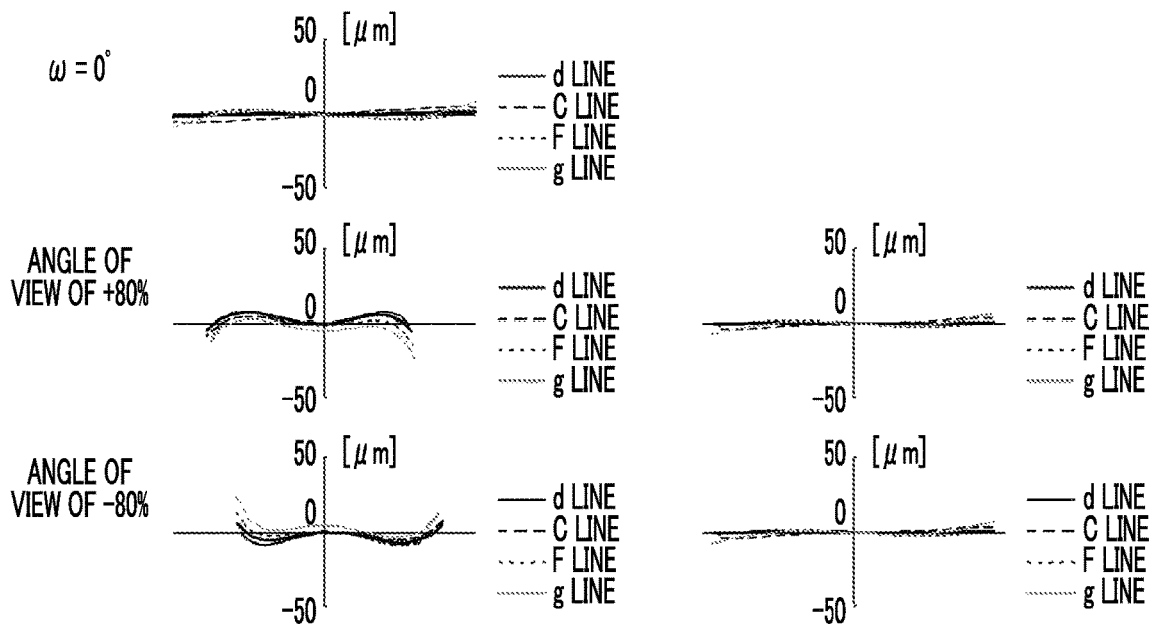
IMAGE BLUR CORRECTION
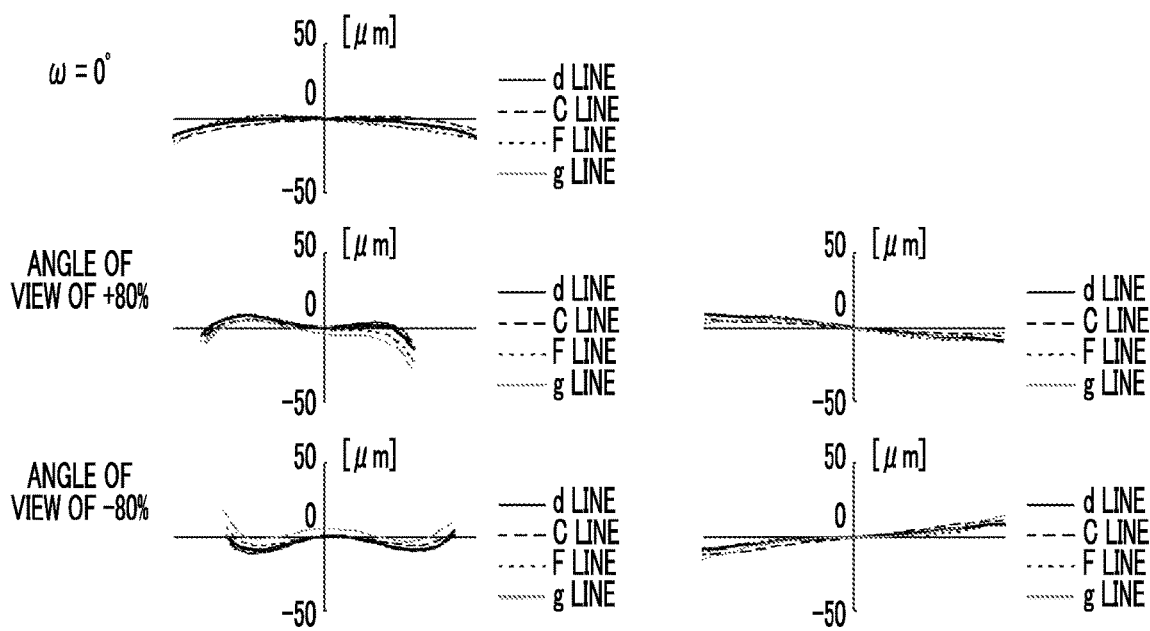

FIG. 19
EXAMPLE 3
NO IMAGE BLUR CORRECTION
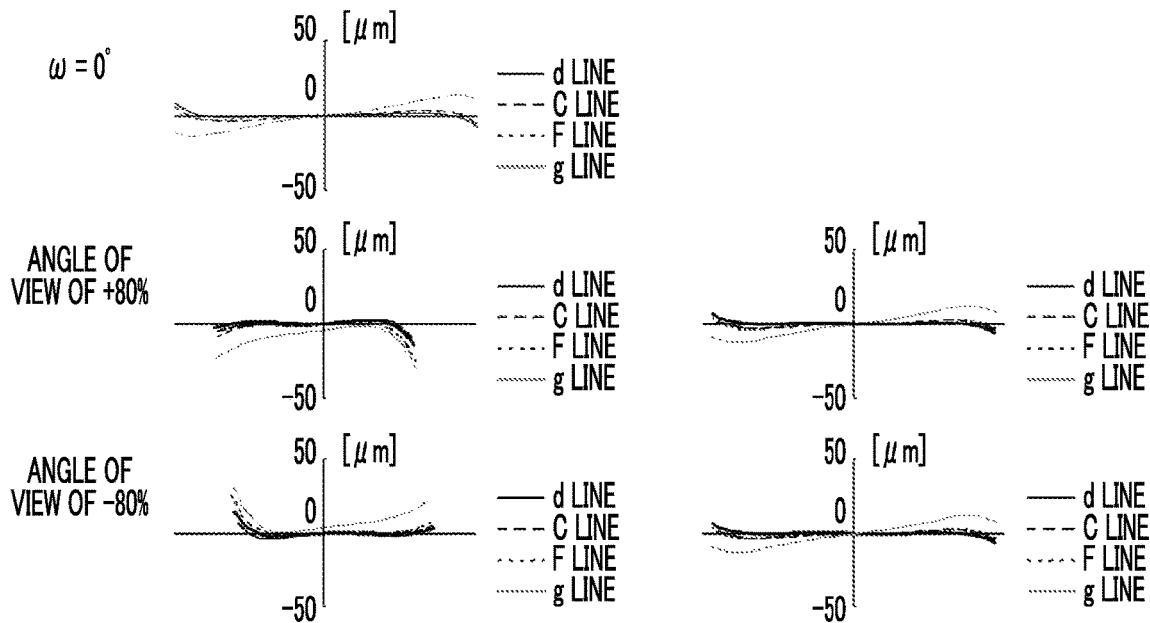
IMAGE BLUR CORRECTION
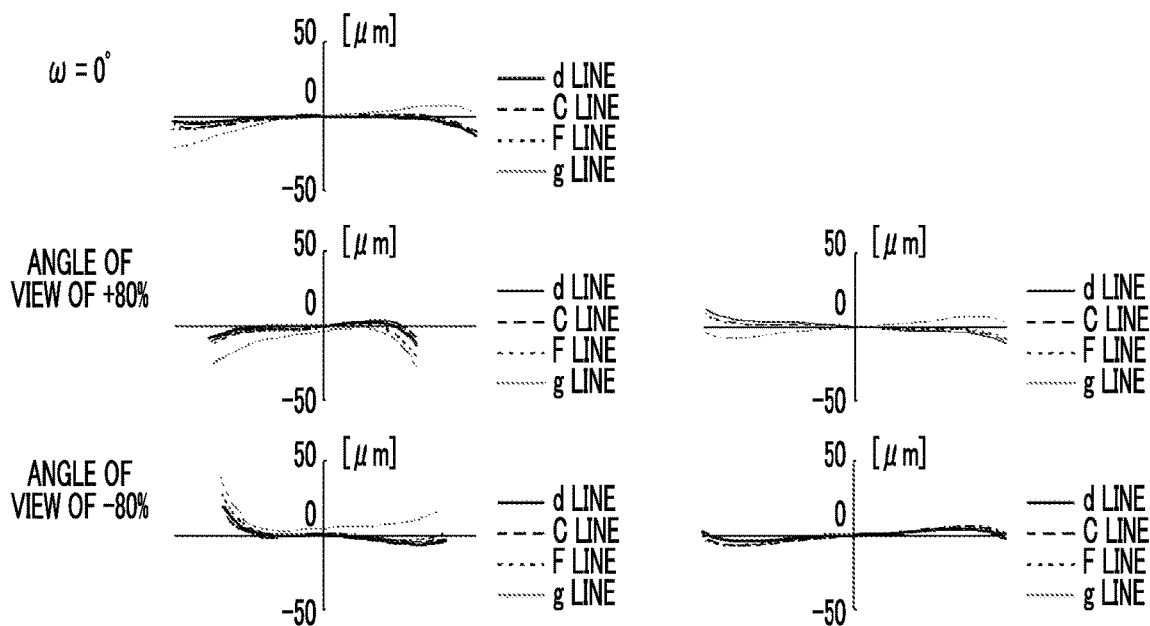

FIG. 20
EXAMPLE 4
NO IMAGE BLUR CORRECTION
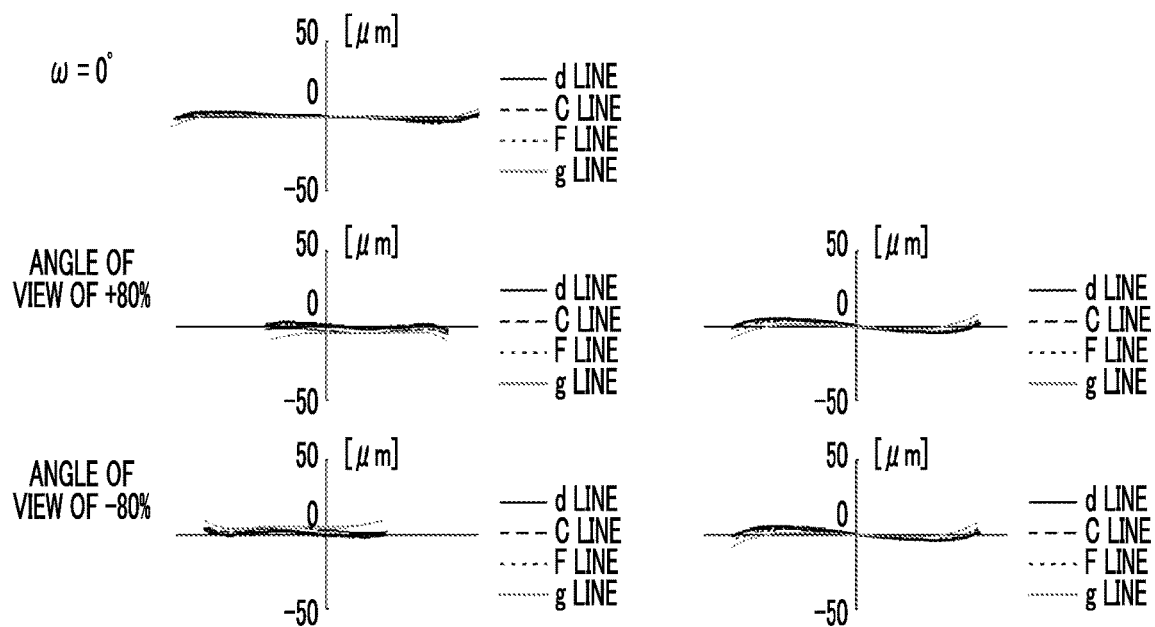
IMAGE BLUR CORRECTION
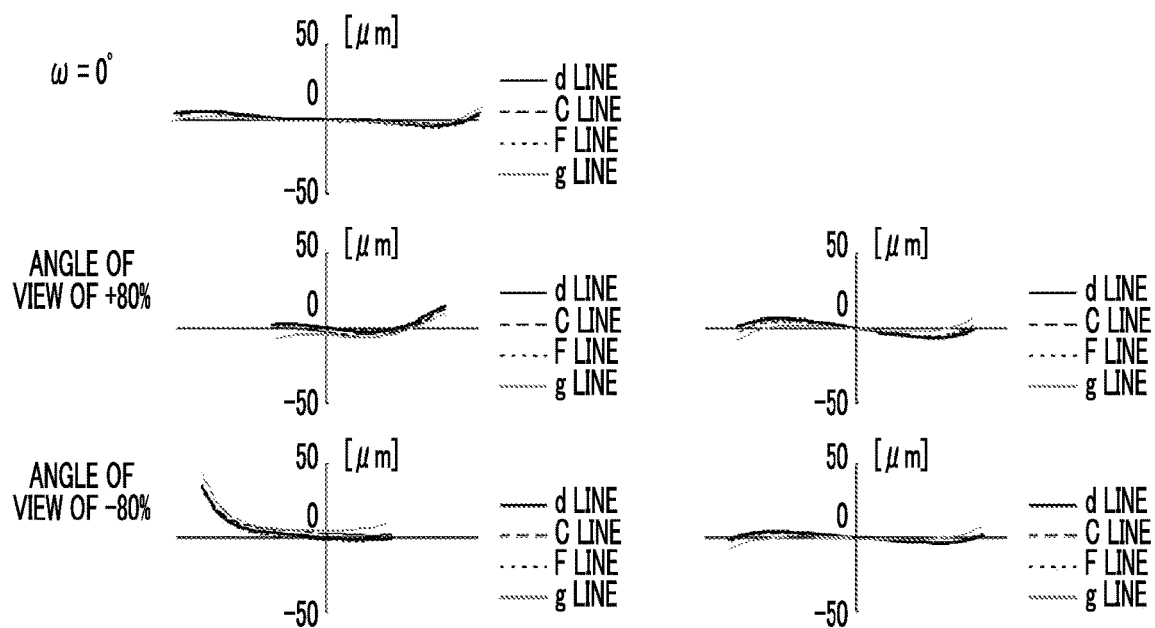

FIG. 21
EXAMPLE 5
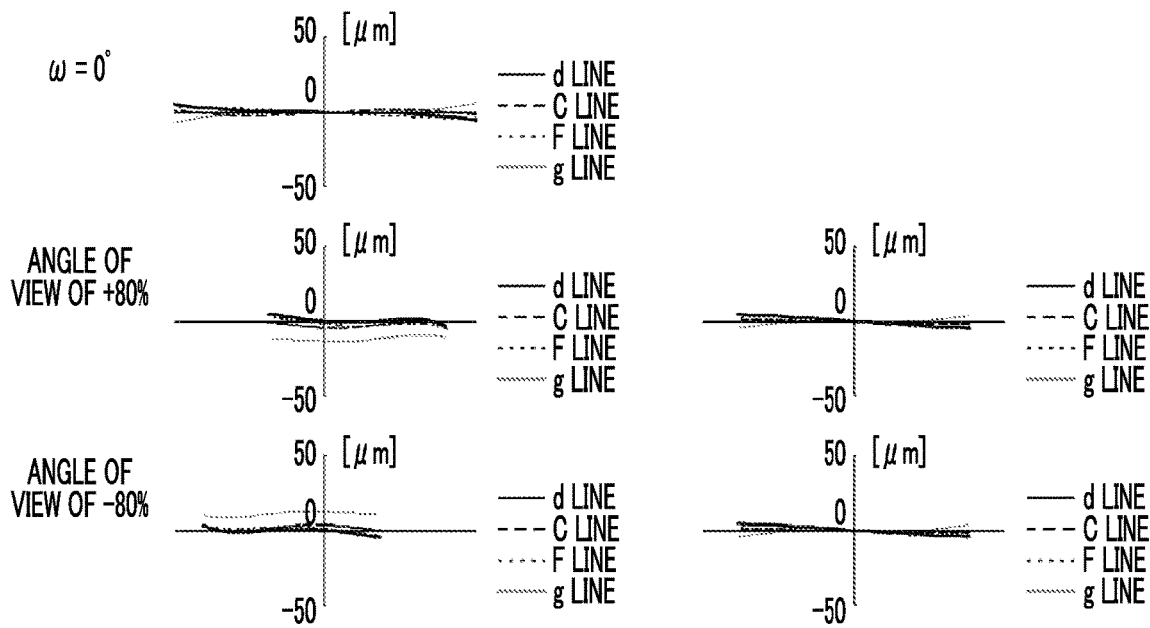
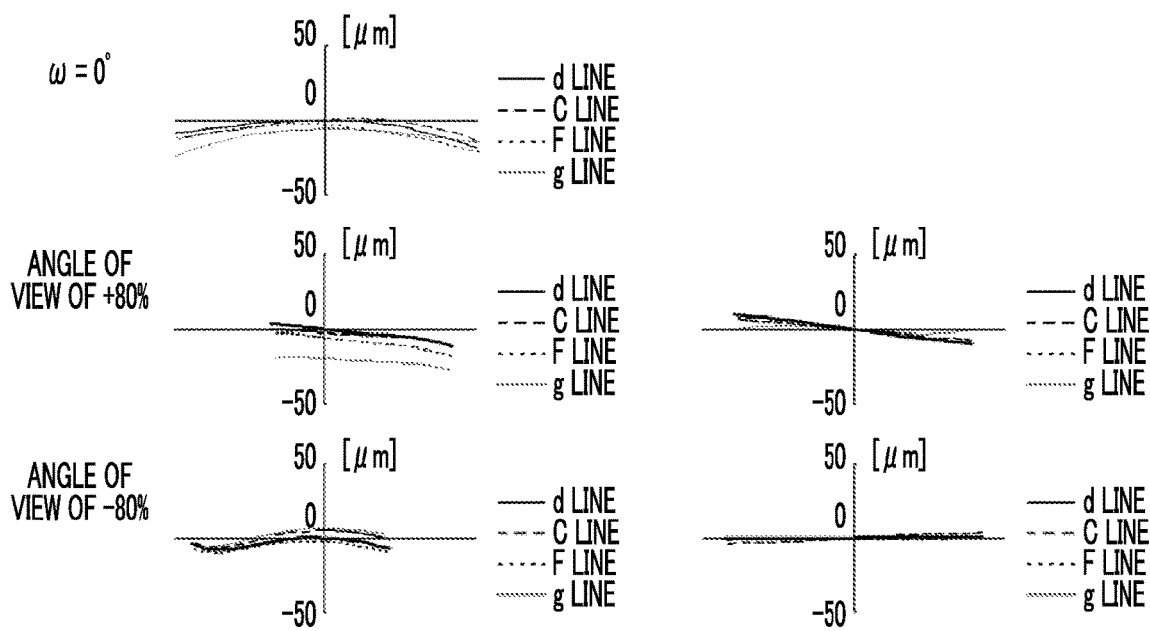

FIG. 22
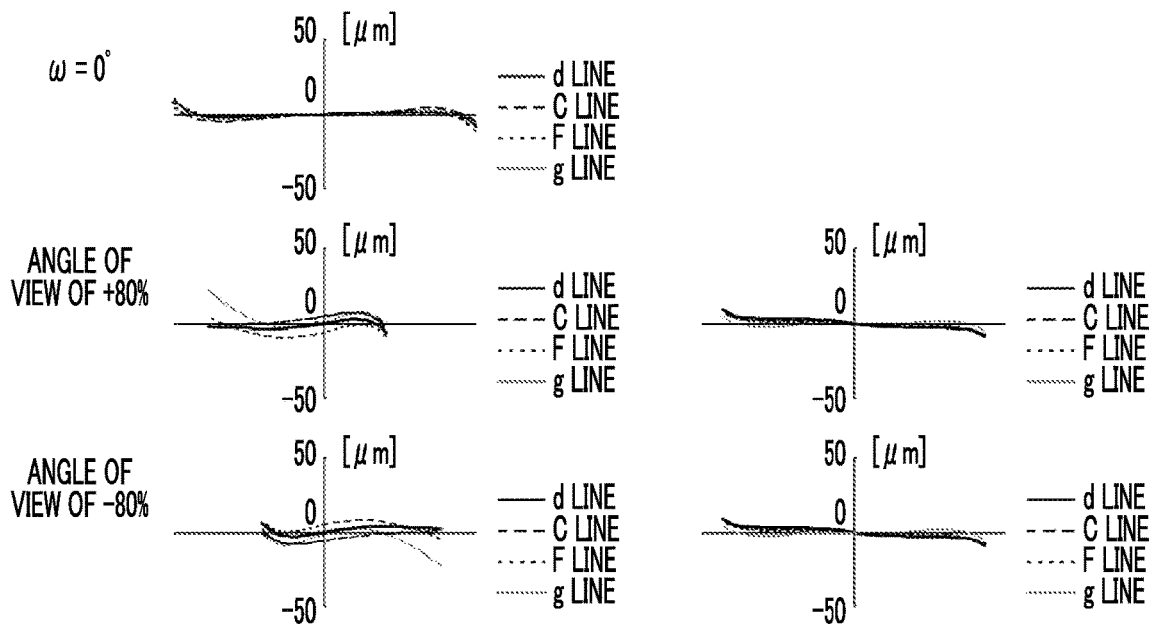
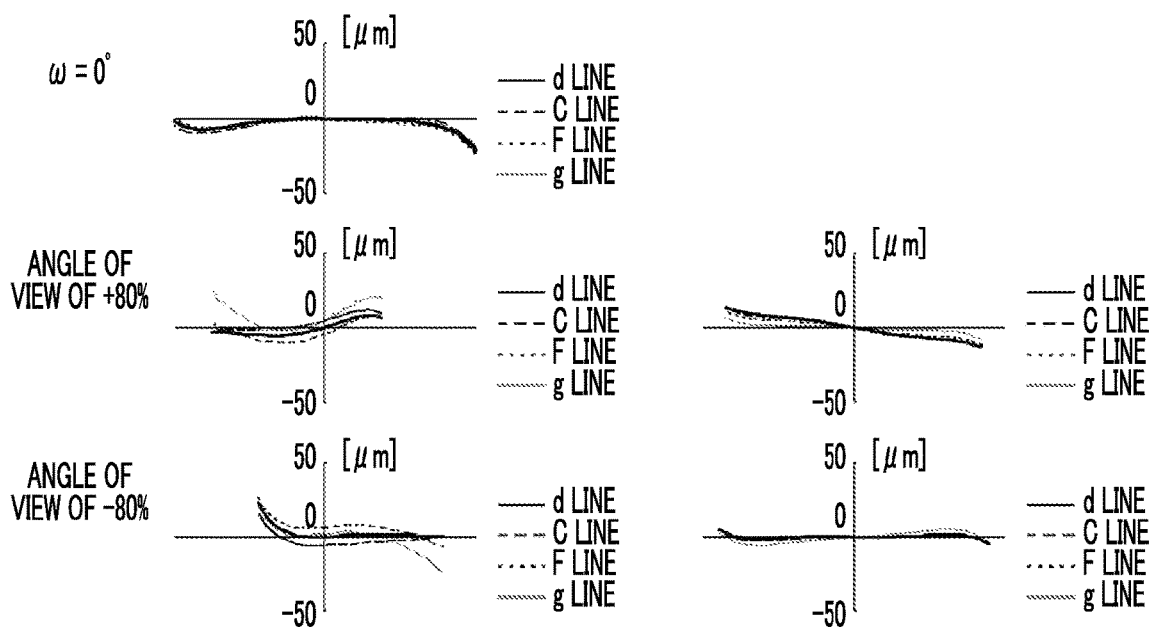

FIG. 23
EXAMPLE 7
NO IMAGE BLUR CORRECTION
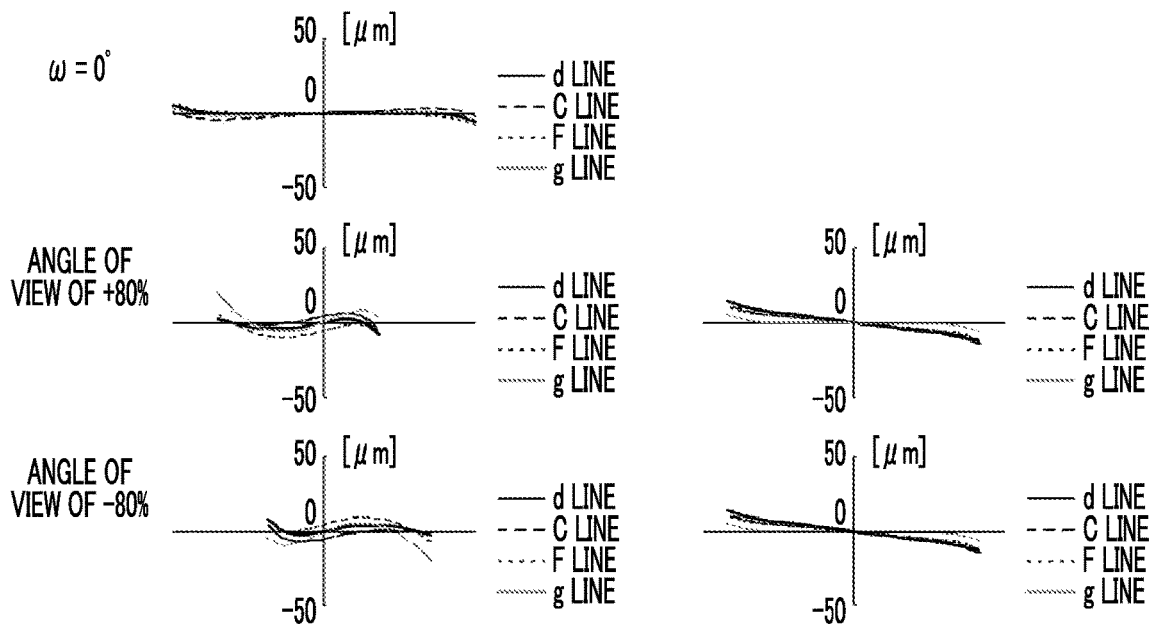
IMAGE BLUR CORRECTION
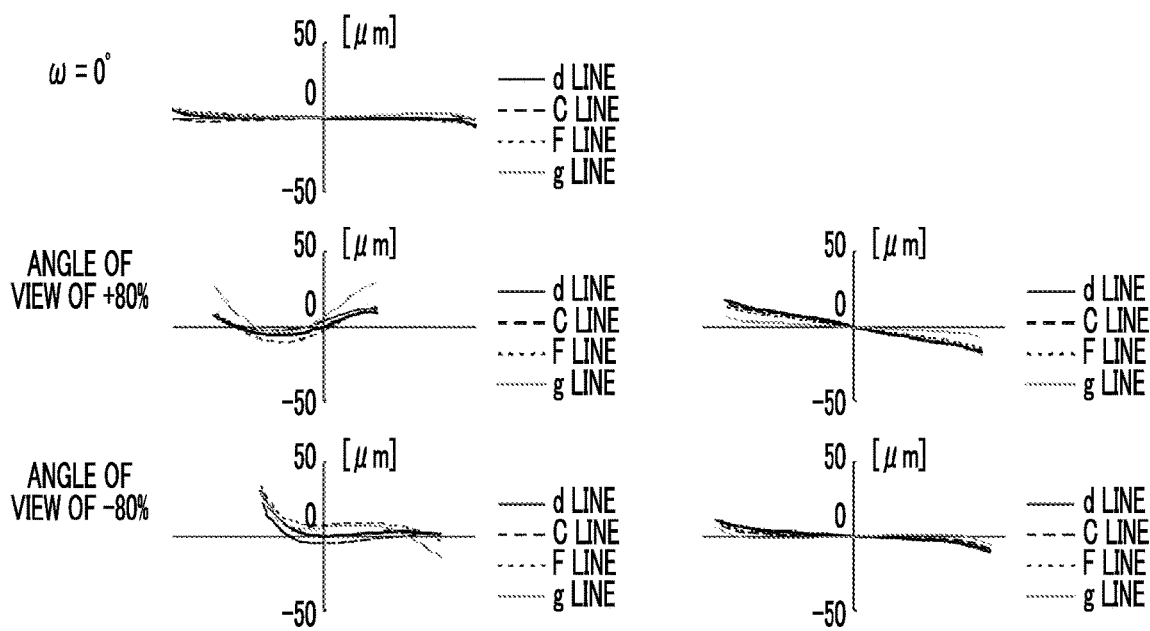

FIG. 24
EXAMPLE 8
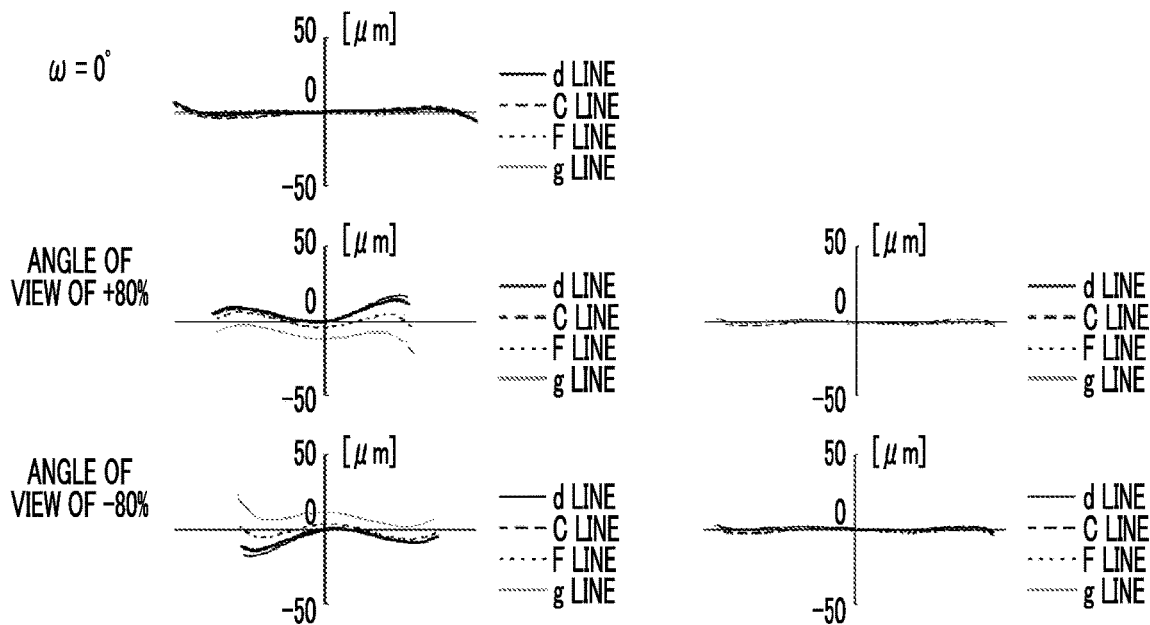
NO IMAGE BLUR CORRECTION
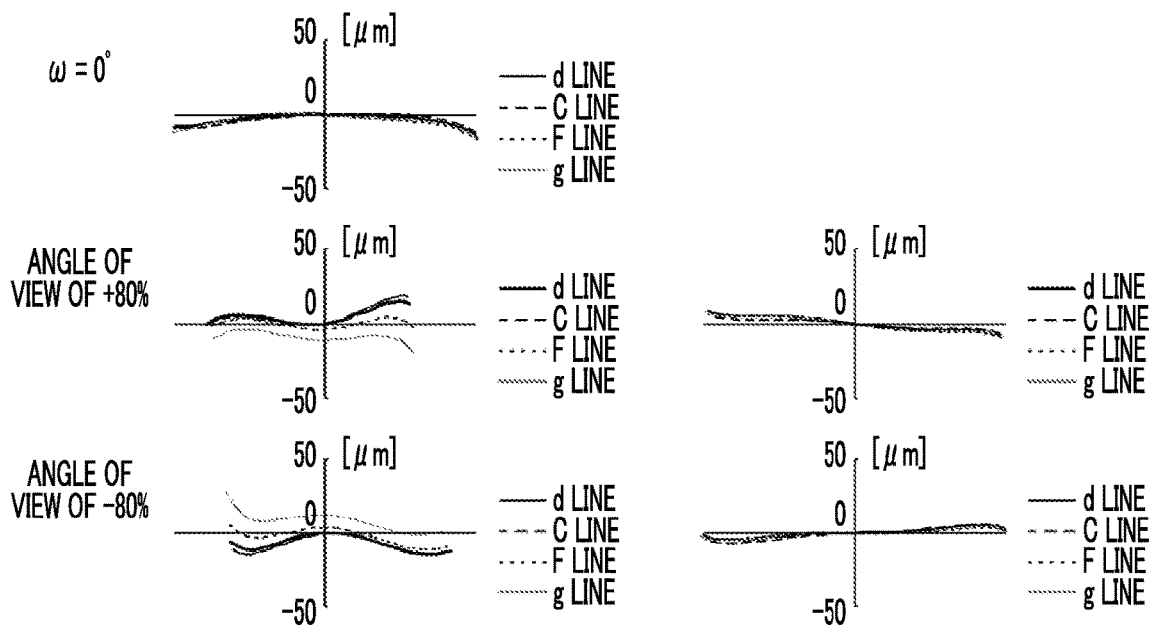
IMAGE BLUR CORRECTION

IMAGING LENS HAVING A HIGH MAXIMUM IMAGING MAGNIFICATION AND A SMALL F NUMBER AND IMAGING APPARATUS

CROSS-REFERENCE TO RELATED APPLICATIONS

The present application claims priority under 35 U.S.C. § 119 to Japanese Patent Application No. 2016-240060, filed on Dec. 12, 2016. The above application is hereby expressly incorporated by reference, in its entirety, into the present application.

BACKGROUND OF THE INVENTION

1. Field of the Invention

The present invention relates to an imaging lens, which is suitable for a digital camera, a video camera, and the like, and an imaging apparatus which comprises the imaging lens.

2. Description of the Related Art

In the related art, in imaging lenses such as a digital camera, a so-called floating focus system is known in which focusing is performed by moving two or more lens groups with different loci. For example, JP2014-6487A, JP2014-142601A, JP2001-21798A, and JP2014-219601A disclose optical system employing a floating focus system in which a lens group closest to the object side and a lens group closest to the image side are made to remain stationary during focusing, and two lens groups moving during focusing (hereinafter referred to as a focus lens group) are disposed therebetween.

SUMMARY OF THE INVENTION

For digital cameras, it is preferable to have a high maximum imaging magnification, a small F number, and high close range optical performance. Further, in recent years, the demand for increasing the speed of auto focusing has increased. Particularly, in macro lenses, the amount of movement of the focus lens group tends to inevitably become large, and thus reduction in weight of the focus lens group has been an important issue. Reduction in weight of the focus lens group not only leads to an increase in speed of auto focusing but also leads to reduction in size and weight of the whole lens system, reduction in size of a motor caused by reducing the power load of the focusing mechanism, and reduction in operation noise of the motor.

Another important issue is suppression of fluctuation in aberration during focusing. Even in a case where a small number of lenses constitute a focus lens group in order to achieve reduction in weight, it is necessary to consider fluctuation in aberration, particularly, fluctuation in spherical aberration and chromatic aberration.

In the lens system described in JP2014-6487A, the maximum imaging magnification in a case of the closest range is as low as about 0.15 times. In the lens system described in JP2014-6487A, in a case where it is intended to more increase the maximum imaging magnification, it is difficult to suppress fluctuation in aberration, in particular, fluctuation in chromatic aberration during focusing.

In the lens system described in JP2014-142601A, it is extremely difficult to suppress fluctuation in aberration, particularly, fluctuation in spherical aberration and coma aberration, caused by movement of the focus lens group. In a case where it is intended to make the magnification higher than the maximum imaging magnification of the ordinary imaging lens, it is extremely difficult to correct the chromatic aberration at the time of close range imaging.

In the lens system of Example 1 of JP2001-21798A, the maximum aperture F number at the time of imaging the object at infinity is 4.0, and it can not be said that the F number is small. In a case where it is intended to further reduce the F number, it is difficult to suppress fluctuation in aberration, particularly, fluctuation in spherical aberration and chromatic aberration during focusing. In the lens system according to another example of JP2001-21798A, a first focus lens group having a large lens outer diameter is formed of three or four lenses. Thus, the weight of the first focus lens group is large, and it is difficult to say that the weight of the focus lens group is sufficiently reduced.

In the lens system described in JP2014-219601A, further, a first focus lens group having a large lens outer diameter is formed of three lenses. Thus, in the lens system, the weight of the first focus lens group is large.

The present invention has been made in consideration of the above situations, and it is an object of the present invention to provide an imaging lens, which has a high maximum imaging magnification and a small F number and in which the weights of the focus lens groups are reduced and fluctuation in aberration during focusing is suppressed such that high optical performance is maintained, and an imaging apparatus comprising the imaging lens.

An imaging lens of the present invention consists of, in order from an object side: a first lens group that has a positive refractive power; a second lens group; and a third lens group. The second lens group has a first focus lens group, which is disposed to be closest to the object side of the second lens group and has a negative refractive power, and a second focus lens group which is disposed to be closest to an image side of the second lens group and has a positive refractive power. During focusing from an object at infinity to a close-range object, the first focus lens group and the second focus lens group are moved respectively by changing a mutual spacing therebetween in a direction of an optical axis, and a lens group other than the first and second focus lens groups remains stationary with respect to an image plane. The first lens group has at least two positive lenses and at least one negative lens. The first focus lens group consists of two or less lenses including one negative lens. The second focus lens group has at least one positive lens. All Conditional Expressions (1) to (3) are satisfied.

$$45 < vF1n \tag{1}$$

$$65 < vF2p \tag{2}$$

$$0.4 < fG1/f < 0.85 \tag{3}$$

Here, vF1n is a maximum value of an Abbe number of the negative lens within the first focus lens group at a d line, vF2p is a maximum value of an Abbe number of the positive lens within the second focus lens group at the d line, fG1 is a focal length of the first lens group, and f is a focal length of the whole system during focusing on the object at infinity.

It is preferable that the imaging lens of the present invention satisfies at least one of Conditional Expression (1-1), (1-2), (3-1), (4), (6), (7), (8), or (9).

$$50 < vF1n < 100 \tag{1-1}$$

$$55 < vF1n < 85 \tag{1-2}$$

$$0.45 < fG1/f < 0.8 \quad (3\text{-}1)$$

$$0.6 < |mF2/mF1| < 2.2 \quad (4)$$

$$0.4 < |fF1/f| < 1.2 \quad (6)$$

$$0.3 < fF2/f < 0.9 \quad (7)$$

$$0.95 < |fF1/fF2| < 2.1 \quad (8)$$

$$1.1 < TL/f < 2.3 \quad (9)$$

Here, vF1n is a maximum value of an Abbe number of the negative lens within the first focus lens group at a d line, fG1 is a focal length of the first lens group, f is a focal length of the whole system during focusing on the object at infinity, mF2 is a difference between positions of the second focus lens group in the direction of the optical axis during focusing on the object at infinity and during focusing on a closest object, mF1 is a difference between positions of the first focus lens group in the direction of the optical axis during focusing on the object at infinity and during focusing on the closest object, fF1 is a focal length of the first focus lens group, fF2 is a focal length of the second focus lens group, and TL is a sum of a back focus as an air conversion distance and a distance on the optical axis from a lens surface closest to the object side to a lens surface closest to the image side.

In the imaging lens of the present invention, it is preferable that the second focus lens group has at least one positive lens and at least one negative lens. In addition, the second focus lens group may consist of two positive lenses and one negative lens.

In the imaging lens of the present invention, it is preferable that the first lens group consists of five or less lenses including at least three positive lenses and at least one negative lens.

In the imaging lens of the present invention, it is preferable that the first lens group has at least two positive lenses which satisfy Conditional Expression (5).

$$60 < vG1p \quad (5)$$

Here, vG1p is an Abbe number of the positive lens within the first lens group at the d line.

In the imaging lens of the present invention, it is preferable that during focusing from the object at infinity to the close-range object, the first focus lens group and the second focus lens group move in directions opposite to each other in any case.

In the imaging lens of the present invention, it is preferable that the third lens group has a vibration-proof lens group, which has a negative refractive power and performs image blur correction by moving in a direction perpendicular to the optical axis, and a stationary lens group which has a positive refractive power and does not move during the image blur correction. In this case, it is preferable that the vibration-proof lens group consists of one positive lens and two negative lenses.

In the imaging lens of the present invention, the first focus lens group may consist of one single lens which has a negative refractive power.

In the imaging lens of the present invention, an aperture stop may be disposed between the first focus lens group and the second focus lens group.

In the imaging lens of the present invention, the third lens group may have a negative refractive power.

An imaging apparatus of the present invention comprises the imaging lens of the present invention.

In the present description, it should be noted that the terms "consist(s) of" means that lenses substantially having no powers, optical elements, which are not lenses, such as a stop and a cover glass, and mechanism parts such as a lens flange, a lens barrel, an imaging element, and a hand shaking correction mechanism, etc. may be included, in addition to the constituent elements listed above.

In addition, the term "~ group that has a positive refractive power" means that the group has a positive refractive power as a whole. It is the same for the term "~ group that has a negative refractive power". Reference signs of refractive powers of the groups and reference signs of refractive powers of the lenses are assumed as those in paraxial regions in a case where some lenses have aspheric surfaces. The "group" is not necessarily formed of a plurality of lenses, but may be formed as only one lens. Further, the "single lens" means that the lens is formed of one lens which is not cemented.

In addition, the number of lenses mentioned above is the number of lenses formed as the elements. For example, the number of lenses of the cemented lenses, in which a plurality of single lenses having different materials is cemented, indicates the number of single lenses constituting the cemented lenses. However, a compound aspheric lens (a lens in which a spherical lens and a film of an aspheric surface shape formed on the spherical lens are formed integrally and which functions as one aspheric lens as a whole) is not considered as a cemented lens, and is treated as one lens. Further, all the above-mentioned conditional expressions are based on the d line (a wavelength of 587.56 nm (nanometers)).

According to the present invention, a lens system includes, in order from the object side, the first lens group having a positive refractive power, the second lens group, and the third lens group. In the lens system employing the floating focus system, configurations of the focus lens groups and configurations of the other lens groups are appropriately set, and predetermined conditional expressions are satisfied. Thereby, it is possible to provide an imaging lens, which has a high maximum imaging magnification and a small F number and in which the weights of the focus lens groups are reduced and fluctuation in aberration during focusing is suppressed such that high optical performance is maintained, and an imaging apparatus comprising the imaging lens.

BRIEF DESCRIPTION OF THE DRAWINGS

FIG. 1 is a cross-sectional view illustrating a configuration and an optical path of an imaging lens of Example 1 of the present invention.

FIG. 2 is a cross-sectional view illustrating a configuration and an optical path of an imaging lens of Example 2 of the present invention.

FIG. 3 is a cross-sectional view illustrating a configuration and an optical path of an imaging lens of Example 3 of the present invention.

FIG. 4 is a cross-sectional view illustrating a configuration and an optical path of an imaging lens of Example 4 of the present invention.

FIG. 5 is a cross-sectional view illustrating a configuration and an optical path of an imaging lens of Example 5 of the present invention.

FIG. 6 is a cross-sectional view illustrating a configuration and an optical path of an imaging lens of Example 6 of the present invention.

FIG. 7 is a cross-sectional view illustrating a configuration and an optical path of an imaging lens of Example 7 of the present invention.

FIG. 8 is a cross-sectional view illustrating a configuration and an optical path of an imaging lens of Example 8 of the present invention.

FIG. 17 is a diagram of lateral aberrations of the imaging lens of Example 1 of the present invention.

FIG. 18 is a diagram of lateral aberrations of the imaging lens of Example 2 of the present invention.

FIG. 19 is a diagram of lateral aberrations of the imaging lens of Example 3 of the present invention.

FIG. 20 is a diagram of lateral aberrations of the imaging lens of Example 4 of the present invention.

FIG. 21 is a diagram of lateral aberrations of the imaging lens of Example 5 of the present invention.

FIG. 22 is a diagram of lateral aberrations of the imaging lens of Example 6 of the present invention.

FIG. 23 is a diagram of lateral aberrations of the imaging lens of Example 7 of the present invention.

FIG. 24 is a diagram of lateral aberrations of the imaging lens of Example 8 of the present invention.

DESCRIPTION OF THE PREFERRED EMBODIMENTS

Figure 9:
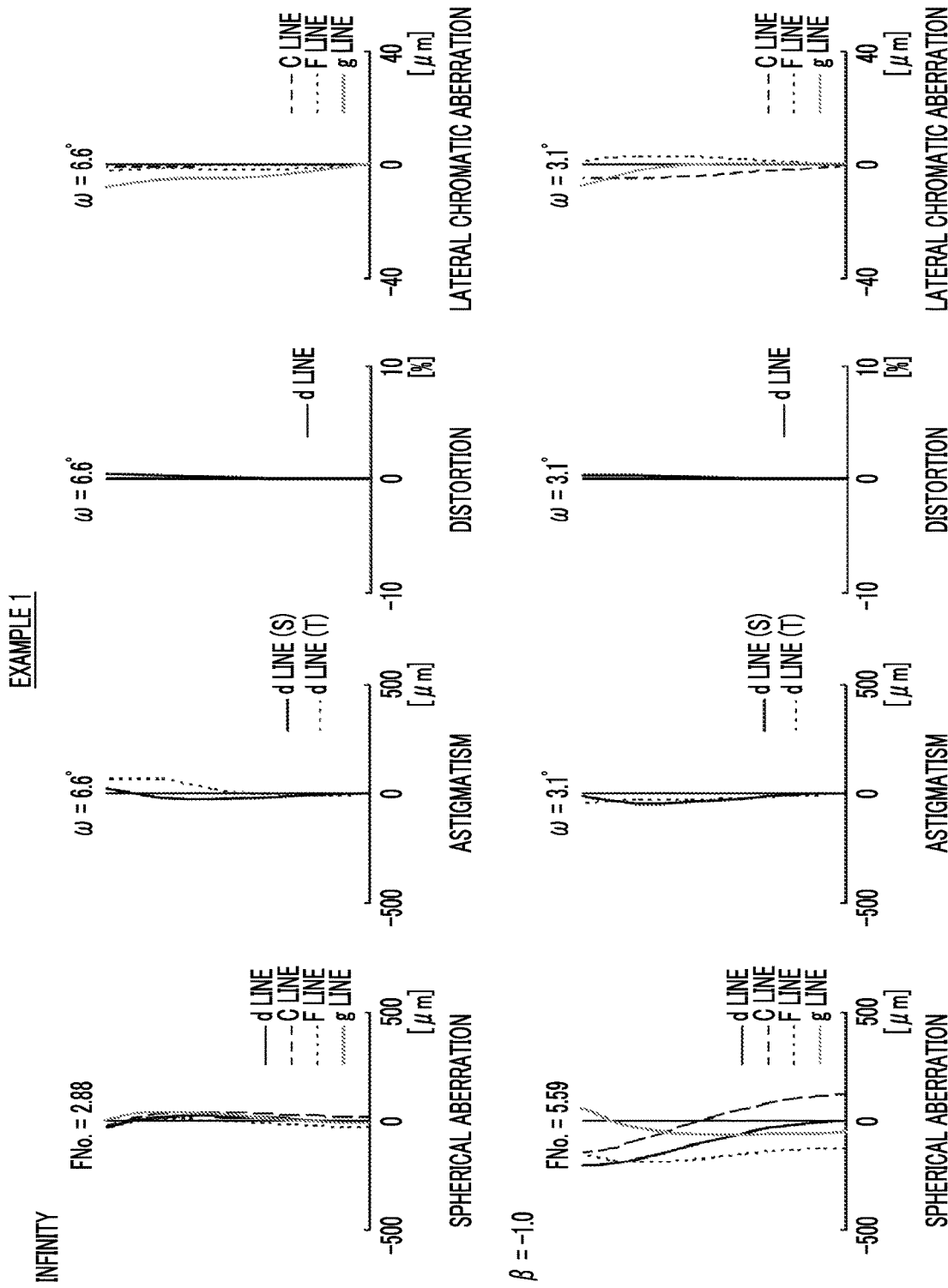
FIG. 9 is a diagram of aberrations of the imaging lens of Example 1 of the present invention, where the diagram includes spherical aberration diagram, astigmatism diagram, distortion diagram, and lateral chromatic aberration diagram, in order from the left side thereof.

Hereinafter, embodiments of the present invention will be described with reference to drawings. FIGS. 1 to 8 are cross-sectional views illustrating configurations and optical paths of imaging lenses according to an embodiment of the present invention, and respectively correspond to Examples 1 to 8 to be described later. All examples shown in FIGS. 1 to 8 are imaging lenses capable of performing equal magnification imaging. Basic configurations and illustration methods of examples shown in FIGS. 1 to 8 are the same, and will be hereinafter described with reference to mainly the example shown in FIG. 1. In FIG. 1, the left side thereof is the object side and the right side thereof is the image side, where regarding the optical paths, on-axis rays 2 and off-axis rays 3 with the maximum angle of view are shown. In FIG. 1, the upper side labeled as "infinity" shows a configuration in a case where an object at infinity is in focus, and the lower side labeled as "$\beta=-1.0$" shows a configuration in a case where a close-range object is in focus at an imaging magnification of the equal magnification.

This imaging lens consists of, in order from the object side to the image side along the optical axis Z, a first lens group G1 having a positive refractive power, a second lens group G2, and a third lens group G3. In the example of FIG. 1, the first lens group G1 includes lenses L11 to L15 in order from the object side, the second lens group G2 includes a lens L21, an aperture stop St, and lenses L22 to L24, in order from the object side, and the third lens group G3 includes lenses L31 to L39 in order from the object side. It should be noted that the aperture stop St shown in FIG. 1 does not necessarily indicate its sizes and/or shapes, and indicates a position of the aperture stop St on the optical axis Z.

In a case where it is intended to apply the imaging lens to the imaging apparatus, in accordance with a configuration of the imaging apparatus, it is preferable that an infrared cut filter, a lowpass filter, various other filters, a cover glass, and/or the like are disposed between an optical system and an image plane Sim. Therefore, in FIG. 1 shows an example in which an optical member PP assumed as the elements and having a plane parallel plate shape is disposed between the lens system and the image plane Sim. However, in the present invention, the position of the optical member PP is not limited to the position shown in FIG. 1, and the optical member PP may be omitted.

The second lens group G2 of the imaging lens has a first focus lens group F1, which is disposed to be closest to the object side of the second lens group G2 and has a negative refractive power, and a second focus lens group F2 which is disposed to be closest to an image side of the second lens group G2 and has a positive refractive power. During focusing from an object at infinity to a close-range object, the first focus lens group F1 and the second focus lens group F2 are configured to be moved respectively by changing a mutual spacing therebetween in a direction of an optical axis, and a lens group other than the first and second focus lens groups F1 and F2 is configured to remain stationary with respect to the image plane Sim. That is, the imaging lens employs the floating focusing for moving the first focus lens group F1 and the second focus lens group F2 with different loci during focusing. In addition, the first focus lens group F1 is configured to consist of two or less lenses including one negative lens, and the second focus lens group F2 is configured to have at least one positive lens.

By moving the two lens groups during focusing as described above, it is possible to secure a high maximum imaging magnification and high optical performance in each imaging region. In the power arrangement of the imaging lens, in a case where the first focus lens group F1 is configured to have an appropriate refractive power which does not increase fluctuation in aberration during focusing, the first focus lens group F1, which is disposed to be closer to the object side, in the two focus lens groups inevitably has a larger lens diameter. Therefore, by adopting a configuration in which the first focus lens group F1 consists of two or less lenses, the weight of the first focus lens group F1 is reduced. According to the above-mentioned configuration, it is possible to realize an optical system capable of achieving not only reduction in size and weight of the lens system but also an increase in speed of auto focusing, reduction in size of the motor caused by reducing the power load of the focusing mechanism, and reduction in operation noise of the motor.

It is preferable that during focusing from the object at infinity to the close-range object, the first focus lens group F1 and the second focus lens group F2 move in directions opposite to each other in any case. By moving the lens groups in such a manner, it is possible to reduce the amount of movement of each focus lens group, as compared with the case where the two focus lens groups are moved in the same direction. For example, as in the example of FIG. 1, during focusing from the object at infinity to the close-range object, the first focus lens group F1 can be configured to move to the image side and the second focus lens group F2 can be configured to move to the object side. It should be noted that the two long arrows between the upper side and the lower side in FIG. 1 schematically indicate the directions of movement of the first focus lens group F1 and the second focus lens group F2 during focusing, and the arrows do not show accurate loci of movement.

The first lens group G1 is configured to have at least two positive lenses and at least one negative lens. With such a configuration, it is possible to satisfactorily correct spherical aberration and longitudinal chromatic aberration. Preferably, the first lens group G1 is configured to consist of five or less lenses including at least three positive lenses and at least one negative lens. In such a case, it is possible to satisfactorily correct longitudinal chromatic aberration and spherical aberration, and there is an advantage in weight by setting the number of lenses of the first lens group G1 to five or less.

It is preferable that the first focus lens group F1 consists of one single lens having a negative refractive power. By adopting a configuration in which the first focus lens group F1 is formed of only one lens, it is possible to reduce the weight of the focus lens group. Thus, in addition to reduction in size and weight of the lens system, it is possible to achieve an increase in speed of auto focusing, reduction in size of the motor caused by reduction of the power load, reduction in operation noise of the motor, and the like.

It is preferable that the second focus lens group F2 has at least one positive lens and at least one negative lens. In such a case, it is possible to satisfactorily suppress fluctuations in spherical aberration and longitudinal chromatic aberration during focusing. More preferably, the second focus lens group F2 is configured to consist of two positive lenses and one negative lens. In such a case, it is possible to more satisfactorily suppress fluctuations in spherical aberration and longitudinal chromatic aberration during focusing, and it is also possible to reduce the weight by adopting a configuration in which the second focus lens group F2 is formed of three lenses.

The second lens group G2 may be configured to include lenses other than the first and second focus lens groups F1 and F2. In that case, it is preferable that the second lens group G2 comprises only two lenses or less which remain stationary with respect to the image plane Sim during focusing, the first focus lens group F1, and the second focus lens group F2, as lenses or lens groups having substantial refractive powers. In such a case, a configuration thereof can be made with a small number of lenses. In addition, it becomes easy to secure space for movement of the two focus lens groups, and it is possible to obtain a high maximum imaging magnification.

Alternatively, the second lens group G2 may comprise only the first focus lens group F1 and the second focus lens group F2 as lens groups having substantial refractive powers. In such a case, it becomes easier to secure the space for movement of the two focus lens groups as compared with a case where the lens groups include the lenses which remain stationary with respect to the image plane Sim during focusing, and it is possible to obtain a higher maximum imaging magnification.

It is preferable that the third lens group G3 has negative refractive power. In such a case, it is easy to secure a necessary back focus.

The imaging lens is configured to satisfy all Conditional Expressions (1) to (3).

$$45 < \nu F1n \quad (1)$$

$$65 < \nu F2p \quad (2)$$

$$0.4 < fG1/f < 0.85 \quad (3)$$

Here, $\nu F1n$ is a maximum value of an Abbe number of the negative lens within the first focus lens group F1 at a d line, $\nu F2p$ is a maximum value of an Abbe number of the positive lens within the second focus lens group F2 at the d line, fG1 is a focal length of the first lens group G1, and f is a focal length of the whole system during focusing on the object at infinity.

By satisfying Conditional Expression (1), it is possible to suppress fluctuation in chromatic aberration caused by the movement of the first focus lens group F1. Further, it is preferable that the imaging lens satisfies Conditional Expression (1-1). By not allowing the result of Conditional Expression (1-1) to be equal to or less than the lower limit, it is possible to increase an effect of Conditional Expression (1). By not allowing the result of Conditional Expression (1-1) to be equal to or greater than the upper limit, it is possible to correct longitudinal chromatic aberration and lateral chromatic aberration with in a well-balanced manner, and it is possible to satisfactorily correct various aberrations such as spherical aberration and the like by securing a necessary refractive index. In order to enhance the effect of Conditional Expression (1-1), it is more preferable that Conditional Expression (1-2) is satisfied.

$$50 < \nu F1n < 100 \quad (1\text{-}1)$$

$$55 < \nu F1n < 85 \quad (1\text{-}2)$$

Likewise, by satisfying Conditional Expression (2), it is possible to suppress fluctuation in chromatic aberration caused by the movement of the second focus lens group F2.

Further, it is preferable that the imaging lens satisfies Conditional Expression (2-1). By not allowing the result of Conditional Expression (2-1) to be equal to or less than the lower limit, it is possible to increase an effect of Conditional Expression (2). By not allowing the result of Conditional Expression (2-1) to be equal to or greater than the upper limit, it is possible to correct longitudinal chromatic aberration and lateral chromatic aberration with in a well-balanced manner, and it is possible to satisfactorily correct various aberrations such as spherical aberration and the like by securing a necessary refractive index. Furthermore, it is preferable to satisfy the Conditional Expression (2-2), and it is possible to enhance an effect relating to the lower limit of Conditional Expression (2-2) by not allowing the result of Conditional Expression (2-2) to be equal to or less than the lower limit.

$$67 < \nu F2p < 100 \quad (2\text{-}1)$$

$$71 < \nu F2p < 100 \quad (2\text{-}2)$$

By not allowing the result of Conditional Expression (3) to be equal to or less than the lower limit, the refractive power of the first lens group G1 is prevented from becoming excessively strong. Thus, it is possible to suppress spherical aberration and chromatic aberration occurring in the first lens group G1. By not allowing the result of Conditional Expression (3) to be equal to or greater than the upper limit, the refractive power of the first lens group G1 is prevented from becoming excessively weak. Thus, it is possible to minimize the optical total length. Further, it is possible to minimize the ray height in the two focus lens groups, and this configuration is capable of contributing to reduction in weight of the focus lens group. In order to enhance the effect of Conditional Expression (3), it is preferable that Conditional Expression (3-1) is satisfied.

$$0.45 < fG1/f < 0.8 \quad (3\text{-}1)$$

It is preferable that the imaging lens satisfies Conditional Expression (4). By not allowing the result of Conditional Expression (4) to be equal to or less than the lower limit, the amount of movement of the first focus lens group F1 is prevented from becoming excessively large, and the refractive power of the first lens group G1 is prevented from becoming excessively strong in order to achieve reduction in size of the whole lens system. Therefore, it is possible to satisfactorily correct spherical aberration and longitudinal chromatic aberration of the whole optical system. Alternatively, in order to reduce the amount of movement of the second focus lens group F2, the refractive power of the second focus lens group F2 is prevented from becoming excessively strong. Thus, it is possible to minimize the spherical aberration occurring in the second focus lens group F2. By not allowing the result of Conditional Expression (4) to be equal to or greater than the upper limit, the amount of movement of the second focus lens group F2 is prevented from becoming excessively large. Thus, it is possible to minimize fluctuation in lateral chromatic aberration caused by the movement of the second focus lens group F2. Alternatively, in order to reduce the amount of movement of the first focus lens group F1, the refractive power of the first focus lens group F1 is prevented from becoming excessively strong. Thus, it is possible to suppress occurrence of field curvature and chromatic aberration during focusing. In order to enhance the effect of Conditional Expression (4), it is preferable that Conditional Expression (4-1) is satisfied, and it is more preferable that Conditional Expression (4-2) is satisfied.

$$0.6 < |mF2/mF1| < 2.2 \quad (4)$$

$$0.7 < |mF2/mF1| < 2.1 \quad (4\text{-}1)$$

$$0.85 < |mF2/mF1| < 2.0 \quad (4\text{-}2)$$

Here, mF2 is a difference between positions of the second focus lens group F2 in the direction of the optical axis during focusing on the object at infinity and during focusing on a closest object, and mF1 is a difference between positions of the first focus lens group F1 in the direction of the optical axis during focusing on the object at infinity and during focusing on the closest object.

It is preferable that the first lens group G1 has at least two positive lenses that satisfy Conditional Expression (5). In such a case, it is possible to satisfactorily correct a longitudinal chromatic aberration. Further, it is preferable that the imaging lens satisfies Conditional Expression (5-1). By not allowing the result of Conditional Expression (5-1) to be equal to or less than the lower limit, it is possible to increase an effect of Conditional Expression (5). By not allowing the result of Conditional Expression (5-1) to be equal to or greater than the upper limit, it is possible to satisfactorily correct various aberrations such as spherical aberration by securing a necessary refractive index.

$$60 < \nu G1p \quad (5)$$

$$62 < \nu G1p < 100 \quad (5\text{-}1)$$

Here, νG1p is an Abbe number of the positive lens within the first lens group G1 at the d line.

It is preferable that the imaging lens satisfies Conditional Expression (6). By not allowing the result of Conditional Expression (6) to be equal to or less than the lower limit, the refractive power of the first focus lens group F1 is prevented from becoming excessively strong. Thus, it is possible to suppress occurrence of field curvature and spherical aberration during focusing. By not allowing the result of Conditional Expression (6) to be equal to or greater than the upper limit, the refractive power of the first focus lens group F1 may be prevented from becoming excessively weak, and the refractive power of the first lens group G1 may be prevented from becoming excessively strong. Therefore, it is possible to satisfactorily correct spherical aberration and longitudinal chromatic aberration. Further, the focal length of the whole system at the time of short distance imaging is prevented from becoming short, and thus it is possible to secure a long working distance. In order to enhance the effect of Conditional Expression (6), it is preferable that Conditional Expression (6-1) is satisfied, and it is more preferable that Conditional Expression (6-2) is satisfied.

$$0.4 < |fF1/f| < 1.2 \quad (6)$$

$$0.5 < |fF1/f| < 1.1 \quad (6\text{-}1)$$

$$0.55 < |fF1/f| < 0.95 \quad (6\text{-}2)$$

Here, fF1 is a focal length of the first focus lens group F1, and f is a focal length of the whole system during focusing on the object at infinity.

It is preferable that the imaging lens satisfies Conditional Expression (7). By not allowing the result of Conditional Expression (7) to be equal to or less than the lower limit, the refractive power of the second focus lens group F2 is prevented from becoming excessively strong. Thus, it is possible to minimize spherical aberration occurring in the second focus lens group F2. By not allowing the result of Conditional Expression (7) to be equal to or greater than the upper limit, it is possible to minimize the amount of movement of the second focus lens group F2. Thus, it is possible to minimize fluctuation in lateral chromatic aberration caused by the movement of the second focus lens group F2. In order to enhance the effect of Conditional Expression (7), it is preferable that Conditional Expression (7-1) is satisfied.

$$0.3<fF2/f<0.9 \qquad (7)$$

$$0.4<fF2/f<0.8 \qquad (7\text{-}1)$$

Here, fF2 is a focal length of the second focus lens group F2, and f is a focal length of the whole system during focusing on the object at infinity.

It is preferable that the imaging lens satisfies Conditional Expression (8). By not allowing the result of Conditional Expression (8) to be equal to or less than the lower limit, the refractive power of the first focus lens group F1 is prevented from becoming excessively strong. Thus, it is possible to suppress occurrence of field curvature and spherical aberration during focusing. By not allowing the result of Conditional Expression (8) to be equal to or more than the upper limit, the refractive power of the second focus lens group F2 is prevented from becoming excessively strong. Thus, it is possible to minimize spherical aberration occurring in the second focus lens group F2. In order to enhance the effect of Conditional Expression (8), it is preferable that Conditional Expression (8-1) is satisfied, and it is more preferable that Conditional Expression (8-2) is satisfied.

$$0.95<|fF1/fF2|<2.1 \qquad (8)$$

$$1.0<|fF1/fF2|<2.0 \qquad (8\text{-}1)$$

$$1.1<|fF1/fF2|<1.9 \qquad (8\text{-}2)$$

Here, fF1 is a focal length of the first focus lens group F1, and fF2 is a focal length of the second focus lens group F2.

It is preferable that the imaging lens satisfies Conditional Expression (9). By not allowing the result of Conditional Expression (9) to be equal to or less than the lower limit, it is possible to obtain a maximum imaging magnification of about the equal magnification while satisfactorily correcting various aberrations. Further, in order to reduce the total length, the refractive power of each lens group, particularly the focus lens group, is prevented from becoming excessively strong. Thus, it is possible to increase an allowable amount of error caused by eccentricity of each lens group. By not allowing the result of Conditional Expression (9) to be equal to or greater than the upper limit, it is possible to prevent an increase in size of the lens system. In order to enhance the effect of Conditional Expression (9), it is preferable that Conditional Expression (9-1) is satisfied.

$$1.1<TL/f<2.3 \qquad (9)$$

$$1.2<TL/f<2.1 \qquad (9\text{-}1)$$

Here, a sum of a back focus as an air conversion distance and a distance on the optical axis from a lens surface closest to the object side to a lens surface closest to the image side, and f is a focal length of the whole system during focusing on the object at infinity.

It is preferable that the third lens group G3 has a vibration-proof lens group that has a negative refractive power and performs image blur correction by moving the group in the direction perpendicular to the optical axis Z, and a stationary lens group that has a positive refractive power and does not move during image blur correction.

In the vibration-proof lens group, it is required that the amount of movement during image blur correction is small. Therefore, it is necessary to strengthen the refractive power of the vibration-proof lens group. Therefore, it is effective that a stationary lens group, which has a refractive power with a sign opposite to that of the vibration-proof lens group and does not move during image blur correction, is disposed to be adjacent to the vibration-proof lens group. Since the stationary lens group is disposed, it is possible to minimize fluctuation in aberration in a case where the vibration-proof lens group moves. Further, by making the vibration-proof lens group and the stationary lens group have opposite refractive powers, the aberrations occurring in the vibration-proof lens group and the stationary lens group cancel each other, and all aberrations can be reduced.

The correction effect can be obtained even in a case where the vibration-proof lens group is disposed at any position of the lens system, but the outer diameter of the vibration-proof lens group becomes excessively large in a case where the lens group is disposed in the first lens group G1, and thus this configuration is not preferable. Further, if the vibration-proof lens group is provided in the focus lens group that moves during focusing, the mechanism becomes complicated, the diameter of the lens barrel becomes large, and the weight of the focus lens group increases. Thus, this configuration is not preferable. Further, if a vibration-proof lens group is disposed between the first focus lens group F1 and the second focus lens group F2, in a case where these two focus lens groups are closest to each other, in order to prevent two focus lens groups and the vibration-proof lens group from interfering with each other, the movement of the two focus lens groups is restricted. Thus, there are disadvantages in securing a high maximum imaging magnification and correcting aberrations in a short distance imaging state. From the above, it is preferable that the vibration-proof lens group is disposed in the third lens group G3. In the example of FIG. 1, the third lens group G3 has a vibration-proof lens group G3b, and a first stationary lens group G3a and a second stationary lens group G3c, which do not move during image blur correction, are respectively provided on the object side and the image side of the vibration-proof lens group G3b.

It is preferable that the vibration-proof lens group consists of one positive lens and two negative lenses. In such a case, it is possible to suppress fluctuations in various aberrations such as coma aberration, field curvature, and chromatic aberration in a case of performing the vibration-proof operation.

The aperture stop St can be configured to be disposed between the first focus lens group F1 and the second focus lens group F2. In such a case, it is possible to form a lens system while satisfactorily maintaining the balance between the size of the lens disposed on the image side and the size of the lens disposed on the object side, and the balance between the load in correction of aberrations of the lens disposed on the image side and the load in correction of aberrations of the lens disposed on the object side, in a case where the aperture stop St is set as the boundary.

It should be noted that the aperture diameter of the aperture stop St may be configured to be changed during focusing from the object at infinity to the close-range object. In order to reduce the diameters of the lens closest to the object side and the two focus lens groups, it is preferable to block rays within a practically allowable range in at least one of the two focus lens groups during focusing on the close-range object. In that case, it is necessary to adjust the aperture diameter of the aperture stop St in accordance with the marginal ray height at the position of the aperture stop St during focusing on the close-range object lower than that during focusing on the object at infinity. Furthermore, the aperture diameter of the aperture stop St may be set so as to have a beam diameter smaller than a beam diameter of the lens closest to the object side or the focus lens group determined by light blocking. By setting such an aperture diameter, it is possible to reduce the load of aberration correction during focusing on the close-range object. As a result, it is possible to achieve reduction in number of lenses and reduction in size of the lens system.

Specifically, each of the lens groups can be configured as follows, for example. The first lens group G1 may be configured to consist of, in order from the object side, four positive lenses and one negative lens, or may be configured to consist of, in order from the object side, one negative lens and three positive lenses. The first focus lens group F1 may be configured to consist of one negative lens which is concave toward the image side, or may be configured to consist of a cemented lens which is formed by cementing a positive lens and a negative lens concave toward the image side in order from the object side. The second focus lens group F2 may be configured to consist of, in order from the object side, a single lens, which has a positive refractive power, and a cemented lens which is formed by cementing a negative lens and a positive lens in order from the object side. The vibration-proof lens group of the third lens group G3 may be configured to consist of, in order from the object side, a cemented lens, which is formed by cementing a negative lens and a positive lens concave toward the image side in order from the object side, and a negative lens concave toward the object side.

It should be noted that the above-mentioned preferred configurations and available configurations may be arbitrary combinations, and it is preferable to selectively adopt the configurations in accordance with required specification. According to the present embodiment, it is possible to provide an imaging lens which has a high maximum imaging magnification and a small F number and in which the weights of the focus lens groups are reduced and fluctuation in aberration during focusing is suppressed such that high optical performance is maintained. Here, the "high maximum imaging magnification" means that the maximum imaging magnification is the equal magnification, that is, 1×. In addition, the "small F number" means that the maximum aperture F number is less than 3.0.

Next, numerical examples of the imaging lens of the present invention will be described.

Example 1

A lens configuration of an imaging lens of Example 1 is shown in FIG. 1, and an illustration method and a configuration thereof are as described above. Therefore, repeated description is omitted herein. The imaging lens of Example 1 includes, in order from the object side: a first lens group G1 that has a positive refractive power; a second lens group G2; and a third lens group G3 that has a negative refractive power. The first lens group G1 includes, in order from the object side, five lenses L11 to L15. The second lens group G2 includes, in order from the object side, a first focus lens group F1, an aperture stop St, and a second focus lens group F2. The first focus lens group F1 includes only a lens L21, and the second focus lens group F2 includes, in order from the object side, three lenses L22 to L24. During focusing from the object at infinity to the close-range object, the first focus lens group F1 moves to the image side, the second focus lens group F2 moves to the object side, and the other lens groups remain stationary with respect to the image plane Sim.

The third lens group G3 includes, in order from the object side, a first stationary lens group G3a that remains stationary during image blur correction, a vibration-proof lens group G3b that moves in the direction perpendicular to the optical axis Z and performs image blur correction, and a second stationary lens group G3c that remains stationary during image blur correction. The first stationary lens group G3a includes two lenses L31 and L32 in order from the object side, the vibration-proof lens group G3b includes three lenses L33 to L35 in order from the object side, and the second stationary lens group G3c includes four lenses L36 to L39 in order from the object side.

Table 1 shows basic lens data of the imaging lens of Example 1, and Table 2 shows specification and variable surface spacings. In Table 1, the column of Si shows i-th (i=1, 2, 3, . . . ) surface number. The i-th surface number is attached to each of surfaces of the elements, where i sequentially increases toward the image side when an object side surface of an element closest to the object side is regarded as a first surface. The column of Ri shows a radius of curvature of the i-th surface. The column of Di shows a surface spacing on the optical axis Z between the i-th surface and an i+1 surface. In Table 1, the column of Ndj shows a refractive index of a j-th (j=1, 2, 3, . . . ) element at the d line (a wavelength of 587.6 nm (nanometers)), where j sequentially increases toward the image side when the surface of the element closest to the object side is regarded as the first surface. The column of vdj shows an Abbe number of the j-th element on the basis of the d line. The column of θgFj shows a partial dispersion ratio of the j-th element between the g line (a wavelength of 435.8 nm (nanometers)) and the F line (a wavelength of 486.1 nm (nanometers)). It should be noted that the partial dispersion ratio θgF between the g line and the F line of a certain lens is defined by θgF=(Ng−NF)/(NF−NC), where the refractive indexes of the lens at the g line, the F line, and the C line (a wavelength of 656.3 nm (nanometer)) are Ng, NF, and NC, respectively.

Here, reference signs of radii of curvature of surface shapes convex toward the object side are set to be positive, and reference signs of radii of curvature of surface shapes convex toward the image side are set to be negative. Table 1 additionally shows the aperture stop St and the optical member PP. In Table 1, in a place of a surface number of a surface corresponding to the aperture stop St, the surface number and a term of (St) are noted. A value at the bottom place of Di indicates a spacing between the image plane Sim and the surface closest to the image side in the table. In Table 1, the variable surface spacings, which are variable during focusing, are referenced by the reference signs DD[ ], and are written into places of Di, where object side surface numbers of spacings are noted in [ ].

Table 2 shows values of the focal length f of the whole system, the F number FNo., the maximum total angle of view 2ω, and the variable surface spacing during focusing, on the basis of the d line. (o) in the place of 2ω indicates that the unit thereof is a degree. In Table 2, the respective values in the state where the object at infinity is in focus are denoted in the column labeled as "infinity", and the respective values other than the focal length f of the whole system in a state where the close-range object is in focus at an imaging magnification of the equal magnification are denoted in the column labeled as "β=−1.0".

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Si | Ri | Di | Ndj | vdj | θgFj |
|---|---|---|---|---|---|
| 1 | 281.39013 | 3.699 | 1.63980 | 34.47 | 0.59233 |
| 2 | −223.90827 | 0.499 | | | |
| 3 | 183.55525 | 3.339 | 1.43875 | 94.66 | 0.53402 |
| 4 | 39238.31894 | 0.500 | | | |
| 5 | 83.59344 | 3.977 | 1.43875 | 94.66 | 0.53402 |
| 6 | 329.20687 | 0.390 | | | |
| 7 | 100.15706 | 4.104 | 1.76200 | 40.10 | 0.57655 |
| 8 | −368.92131 | 1.400 | 2.00100 | 29.13 | 0.59952 |
| 9 | 214.82414 | DD[9] | | | |
| 10 | −267.61392 | 1.200 | 1.51633 | 64.14 | 0.53531 |
| 11 | 48.04242 | DD[11] | | | |
| 12(St) | ∞ | DD[12] | | | |
| 13 | 36.93082 | 4.117 | 1.43875 | 94.66 | 0.53402 |
| 14 | −369.72388 | 0.100 | | | |
| 15 | 47.17491 | 1.010 | 1.74950 | 35.33 | 0.58189 |
| 16 | 21.18111 | 5.224 | 1.49700 | 81.54 | 0.53748 |
| 17 | −6673.28679 | DD[17] | | | |
| 18 | 426.59368 | 1.000 | 1.84666 | 23.78 | 0.62054 |
| 19 | 30.19824 | 1.872 | | | |
| 20 | 40.62933 | 4.226 | 1.69680 | 55.53 | 0.54341 |
| 21 | −207.68117 | 3.000 | | | |
| 22 | 301.89318 | 0.960 | 1.75500 | 52.32 | 0.54765 |
| 23 | 17.15529 | 2.800 | 2.00100 | 29.13 | 0.59952 |
| 24 | 25.31483 | 3.200 | | | |
| 25 | −85.00000 | 1.500 | 1.62041 | 60.29 | 0.54266 |
| 26 | 165.00000 | 4.509 | | | |
| 27 | −57.80896 | 1.510 | 1.59522 | 67.73 | 0.54426 |
| 28 | 63.61394 | 4.500 | 2.00069 | 25.46 | 0.61364 |
| 29 | −60.96139 | 2.645 | | | |
| 30 | 38.05641 | 6.500 | 1.69680 | 55.53 | 0.54341 |
| 31 | −60.17807 | 4.000 | | | |
| 32 | −50.62152 | 1.250 | 2.00100 | 29.13 | 0.59952 |
| 33 | 422.78645 | 28.680 | | | |
| 34 | ∞ | 2.850 | 1.51680 | 64.20 | 0.53430 |
| 35 | ∞ | 1.000 | | | |

TABLE 2

Example 1

| | Infinity | β = −1.0 |
|---|---|---|
| f | 121.605 | |
| FNo. | 2.88 | 5.59 |
| 2ω(°) | 13.2 | 6.2 |
| DD[9] | 4.801 | 26.408 |
| DD[11] | 29.079 | 7.472 |
| DD[12] | 31.171 | 3.550 |
| DD[17] | 2.200 | 29.821 |

FIGS. 9 and 17 show diagrams of aberrations of the imaging lens of Example 1. In FIG. 9, in order from the left side, spherical aberration, astigmatism, distortion, and lateral chromatic aberration are shown. In FIG. 9, the upper side labeled as "infinity" shows aberrations in a state where the object at infinity is in focus, and the lower side labeled as "β=−1.0" shows aberrations in a state where the close-range object is in focus at an imaging magnification of the equal magnification. In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and the g line (a wavelength of 435.8 nm (nanometers)) are respectively indicated by the solid line, the long dashed line, the short dashed line, and the gray solid line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the gray solid line. In the spherical aberration diagram, FNo. indicates an F number. In the other aberration diagrams, ω indicates a half angle of view.

In FIG. 17, the left column shows diagrams of lateral aberrations in the tangential direction, and the right column shows diagrams of lateral aberrations in the sagittal direction. FIG. 17 shows aberrations when there is no image blur correction on the upper side labeled as "no image blur correction", and shows aberrations when image blur correction is performed by moving the vibration-proof lens group G3b by 0.44 mm in a case where there is image blurring which causes the optical axis to be inclined by 0.3 degrees on the lower side labeled as "image blur correction". The aberration diagrams of "no image blur correction" show, in order from the top, an aberration at the angle of view of 0°, aberrations at the angle of view of 80% of the maximum angle of view on the positive side, and aberrations at the angle of view of 80% of the maximum angle of view on the negative side. Likewise, the aberration diagrams of "image blur correction" show, in order from the top, an aberration at the angle of view of 0°, aberrations at the angle of view of 80% of the maximum angle of view on the positive side, and aberrations at the angle of view of 80% of the maximum angle of view on the negative side. In the lateral aberration diagrams, aberrations at the d line, the C line, the F line, and the g line are respectively indicated by the solid black line, the long dashed line, the short dashed line, and the gray solid line. All the lateral aberration diagrams are diagrams in a state where the object at infinity is in focus.

In the description of Example 1, reference signs, meanings, and description methods of the respective data pieces are the same as those in the following examples unless otherwise noted. Therefore, in the following description, repeated description will be omitted.

Example 2

Figure 10:
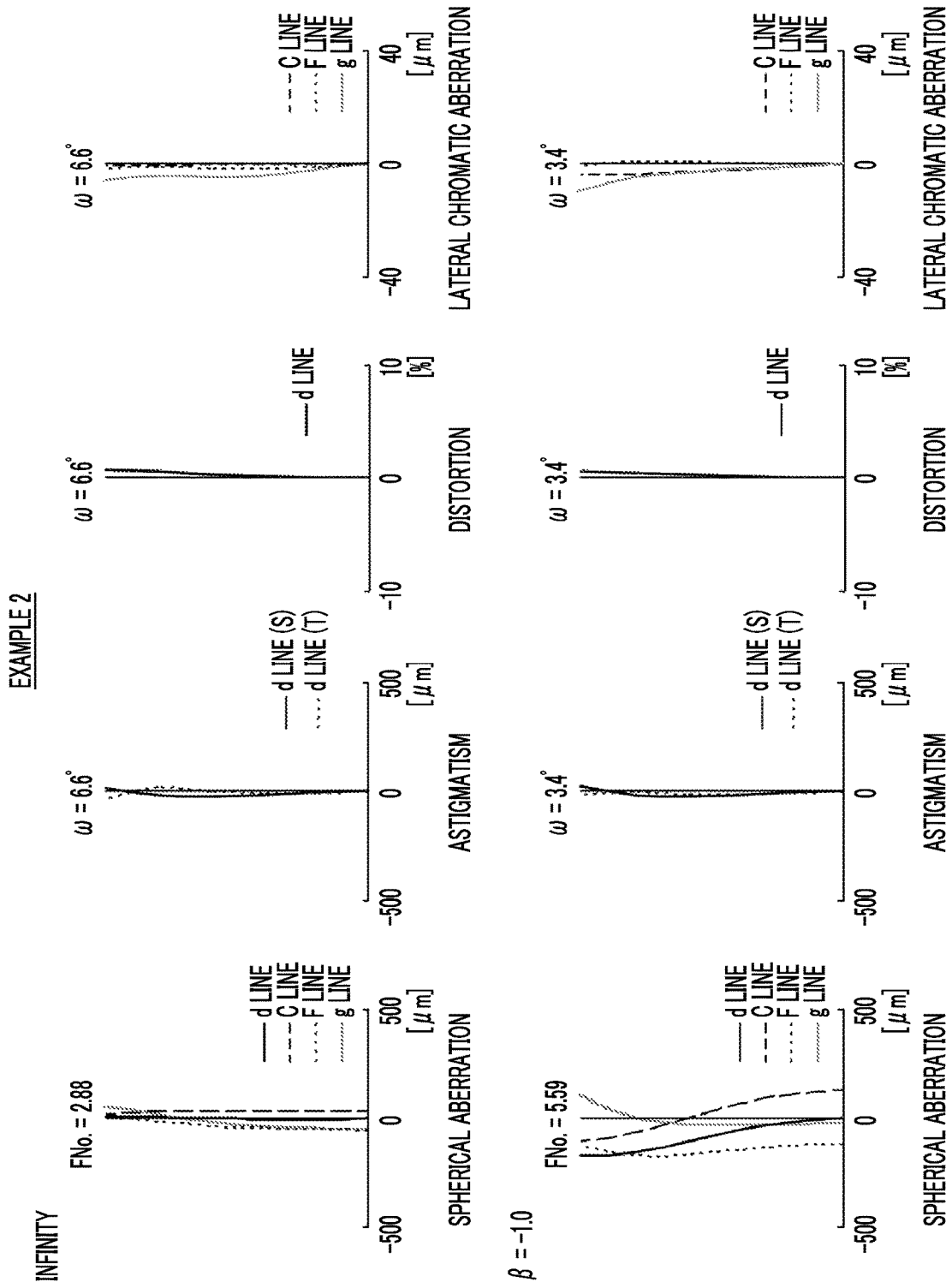
FIG. 10 is a diagram of aberrations of the imaging lens of Example 2 of the present invention, where the diagram includes spherical aberration diagram, astigmatism diagram, distortion diagram, and lateral chromatic aberration diagram, in order from the left side thereof.

FIG. 2 shows a lens configuration of an imaging lens of Example 2. The imaging lens of Example 2 is the same as that of Example 1 in terms of: the group configuration; the signs of the refractive powers of the first lens group G1 and the third lens group G3; the lens groups moving during focusing and the direction of movement thereof; the vibration-proof lens group that performs image blur correction; the lens groups that remain stationary during image blur correction; and the number of lenses constituting each lens group. Table 3 shows basic lens data of the imaging lens of Example 2, Table 4 shows specification and variable surface spacings, and FIGS. 10 and 18 show aberration diagrams thereof. Here, FIG. 18 shows aberrations when image blur correction is performed by moving the vibration-proof lens group G3b by 0.44 mm in a case where there is image blurring which causes the optical axis to be inclined by 0.3 degrees on the lower side labeled as "image blur correction".

TABLE 3

Example 2

| Si | Ri | Di | Ndj | vdj | θgFj |
|---|---|---|---|---|---|
| 1 | 326.04159 | 3.641 | 1.63980 | 34.47 | 0.59233 |
| 2 | −271.96452 | 0.370 | | | |
| 3 | 174.68802 | 3.749 | 1.43875 | 94.66 | 0.53402 |
| 4 | −6330.50491 | 0.257 | | | |
| 5 | 80.09024 | 3.939 | 1.43875 | 94.66 | 0.53402 |
| 6 | 369.03242 | 0.100 | | | |
| 7 | 95.45430 | 4.207 | 1.76200 | 40.10 | 0.57655 |
| 8 | −413.88937 | 1.400 | 2.00100 | 29.13 | 0.59952 |
| 9 | 295.92216 | DD[9] | | | |
| 10 | −301.78200 | 1.200 | 1.51823 | 58.90 | 0.54567 |
| 11 | 42.37215 | DD[11] | | | |
| 12(St) | ∞ | DD[12] | | | |
| 13 | 37.62668 | 4.173 | 1.43875 | 94.66 | 0.53402 |
| 14 | −301.69293 | 0.298 | | | |
| 15 | 59.48099 | 1.164 | 1.74950 | 35.33 | 0.58189 |
| 16 | 21.96065 | 4.969 | 1.53775 | 74.70 | 0.53936 |
| 17 | 21857.03559 | DD[17] | | | |
| 18 | 341.75347 | 1.000 | 1.84666 | 23.78 | 0.62054 |
| 19 | 30.37451 | 1.921 | | | |
| 20 | 41.51001 | 3.480 | 1.69680 | 55.53 | 0.54341 |
| 21 | −169.24513 | 3.010 | | | |
| 22 | 261.87777 | 0.960 | 1.75500 | 52.32 | 0.54765 |
| 23 | 17.41166 | 2.800 | 2.00100 | 29.13 | 0.59952 |
| 24 | 25.26317 | 3.200 | | | |
| 25 | −85.00000 | 1.500 | 1.62041 | 60.29 | 0.54266 |
| 26 | 165.00000 | 4.815 | | | |
| 27 | −57.97555 | 0.998 | 1.59522 | 67.73 | 0.54426 |
| 28 | 65.71377 | 4.500 | 2.00069 | 25.46 | 0.61364 |
| 29 | −60.11371 | 2.939 | | | |
| 30 | 38.31662 | 6.500 | 1.69680 | 55.53 | 0.54341 |
| 31 | −58.90163 | 4.000 | | | |
| 32 | −51.02725 | 1.250 | 2.00100 | 29.13 | 0.59952 |
| 33 | 350.00000 | 28.700 | | | |
| 34 | ∞ | 2.850 | 1.51680 | 64.20 | 0.53430 |
| 35 | ∞ | 1.000 | | | |

TABLE 5

Example 3

| Si | Ri | Di | Ndj | vdj | θgFj |
|---|---|---|---|---|---|
| 1 | 315.10115 | 3.570 | 1.63980 | 34.47 | 0.59233 |
| 2 | −269.45621 | 0.500 | | | |
| 3 | 245.50553 | 3.239 | 1.60300 | 65.44 | 0.54022 |
| 4 | −71798.38632 | 0.277 | | | |
| 5 | 80.33138 | 3.953 | 1.43875 | 94.66 | 0.53402 |
| 6 | 378.85126 | 0.136 | | | |
| 7 | 103.57496 | 4.191 | 1.76200 | 40.10 | 0.57655 |
| 8 | −318.22221 | 1.400 | 2.00100 | 29.13 | 0.59952 |
| 9 | 209.09250 | DD[9] | | | |
| 10 | −387.29643 | 1.315 | 1.48749 | 70.24 | 0.53007 |
| 11 | 47.51785 | DD[11] | | | |
| 12(St) | ∞ | DD[12] | | | |
| 13 | 41.12143 | 4.044 | 1.43875 | 94.66 | 0.53402 |
| 14 | −182.22016 | 0.100 | | | |
| 15 | 52.08660 | 1.010 | 1.74950 | 35.33 | 0.58189 |
| 16 | 20.25909 | 5.014 | 1.59522 | 67.73 | 0.54426 |
| 17 | 207.52431 | DD[17] | | | |
| 18 | 480.50586 | 1.000 | 1.84666 | 23.78 | 0.62054 |
| 19 | 29.80267 | 2.447 | | | |
| 20 | 41.22579 | 3.401 | 1.69680 | 55.53 | 0.54341 |
| 21 | −196.40356 | 3.000 | | | |
| 22 | 253.47108 | 0.960 | 1.75500 | 52.32 | 0.54765 |
| 23 | 17.54862 | 2.800 | 2.00100 | 29.13 | 0.59952 |
| 24 | 25.95615 | 3.200 | | | |
| 25 | −85.00000 | 1.500 | 1.62041 | 60.29 | 0.54266 |
| 26 | 165.00000 | 4.654 | | | |
| 27 | −59.14254 | 0.928 | 1.59522 | 67.73 | 0.54426 |
| 28 | 63.75044 | 4.500 | 2.00069 | 25.46 | 0.61364 |
| 29 | −62.32024 | 3.404 | | | |
| 30 | 39.71653 | 6.500 | 1.69680 | 55.53 | 0.54341 |
| 31 | −59.22904 | 4.000 | | | |
| 32 | −52.74432 | 1.250 | 2.00100 | 29.13 | 0.59952 |
| 33 | 399.00000 | 28.403 | | | |
| 34 | ∞ | 2.850 | 1.51680 | 64.20 | 0.53430 |
| 35 | ∞ | 1.000 | | | |

TABLE 4

Example 2

| | Infinity | β = −1.0 |
|---|---|---|
| f | 121.123 | |
| FNo. | 2.88 | 5.59 |
| 2ω(°) | 13.2 | 6.8 |
| DD[9] | 4.443 | 20.636 |
| DD[11] | 25.149 | 8.956 |
| DD[12] | 32.457 | 2.549 |
| DD[17] | 2.200 | 32.108 |

TABLE 6

Example 3

| | Infinity | β = −1.0 |
|---|---|---|
| f | 122.190 | |
| FNo. | 2.88 | 5.59 |
| 2ω(°) | 13.2 | 6.0 |
| DD[9] | 4.607 | 30.375 |
| DD[11] | 32.238 | 6.470 |
| DD[12] | 31.338 | 4.551 |
| DD[17] | 2.497 | 29.284 |

Example 3

Figure 11:
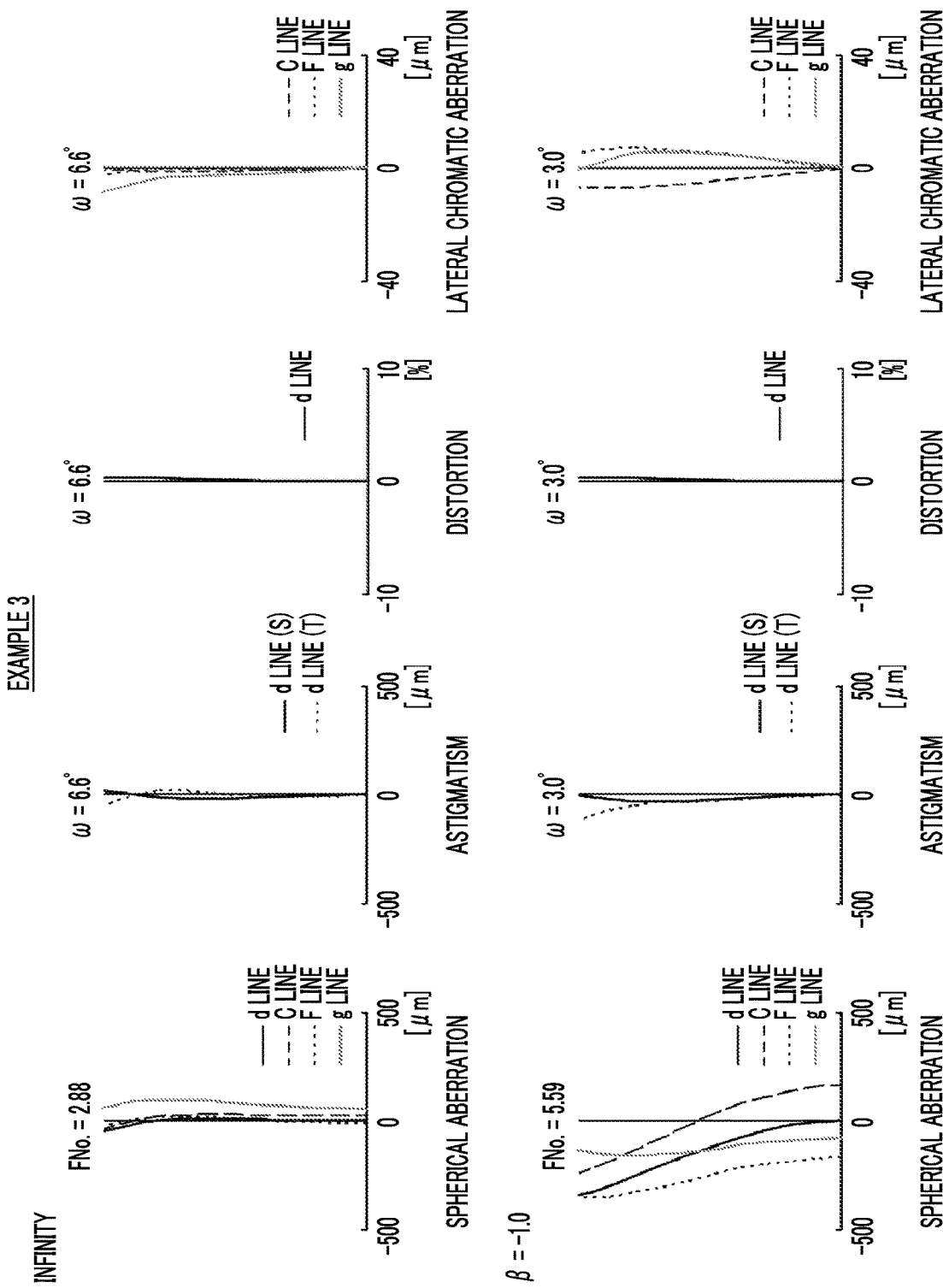
FIG. 11 is a diagram of aberrations of the imaging lens of Example 3 of the present invention, where the diagram includes spherical aberration diagram, astigmatism diagram, distortion diagram, and lateral chromatic aberration diagram, in order from the left side thereof.

FIG. 3 shows a lens configuration of an imaging lens of Example 3. The imaging lens of Example 3 is the same as that of Example 1 in terms of: the group configuration; the signs of the refractive powers of the first lens group G1 and the third lens group G3; the lens groups moving during focusing and the direction of movement thereof; the vibration-proof lens group that performs image blur correction; the lens groups that remain stationary during image blur correction; and the number of lenses constituting each lens group. Table 5 shows basic lens data of the imaging lens of Example 3, Table 6 shows specification and variable surface spacings, and FIGS. 11 and 19 show aberration diagrams thereof. Here, FIG. 19 shows aberrations when image blur correction is performed by moving the vibration-proof lens group G3b by 0.46 mm in a case where there is image blurring which causes the optical axis to be inclined by 0.3 degrees on the lower side labeled as "image blur correction".

Example 4

FIG. 4 shows a lens configuration of an imaging lens of Example 4. The imaging lens of Example 4 includes, in order from the object side: a first lens group G1 that has a positive refractive power; a second lens group G2; and a third lens group G3 that has a negative refractive power. The first lens group G1 includes, in order from the object side, five lenses L11 to L15. The second lens group G2 includes, in order from the object side, a first focus lens group F1 and a second focus lens group F2. The first focus lens group F1 includes only a lens L21, and the second focus lens group F2 includes, in order from the object side, three lenses L22 to L24. During focusing from the object at infinity to the close-range object, the first focus lens group F1 moves to the image side, the second focus lens group F2 moves to the object side, and the other lens groups remain stationary with respect to the image plane Sim.

The third lens group G3 includes, in order from the object side, an aperture stop St, a first stationary lens group G3a that remains stationary during image blur correction, a vibration-proof lens group G3b that performs image blur correction by moving in the direction perpendicular to the optical axis Z, and a second stationary lens group G3c that remains stationary during image blur correction. The first stationary lens group G3a includes two lenses L31 and L32 in order from the object side, the vibration-proof lens group G3b includes three lenses L33 to L35 in order from the object side, and the second stationary lens group G3c includes only a lens L36.

Figure 12:
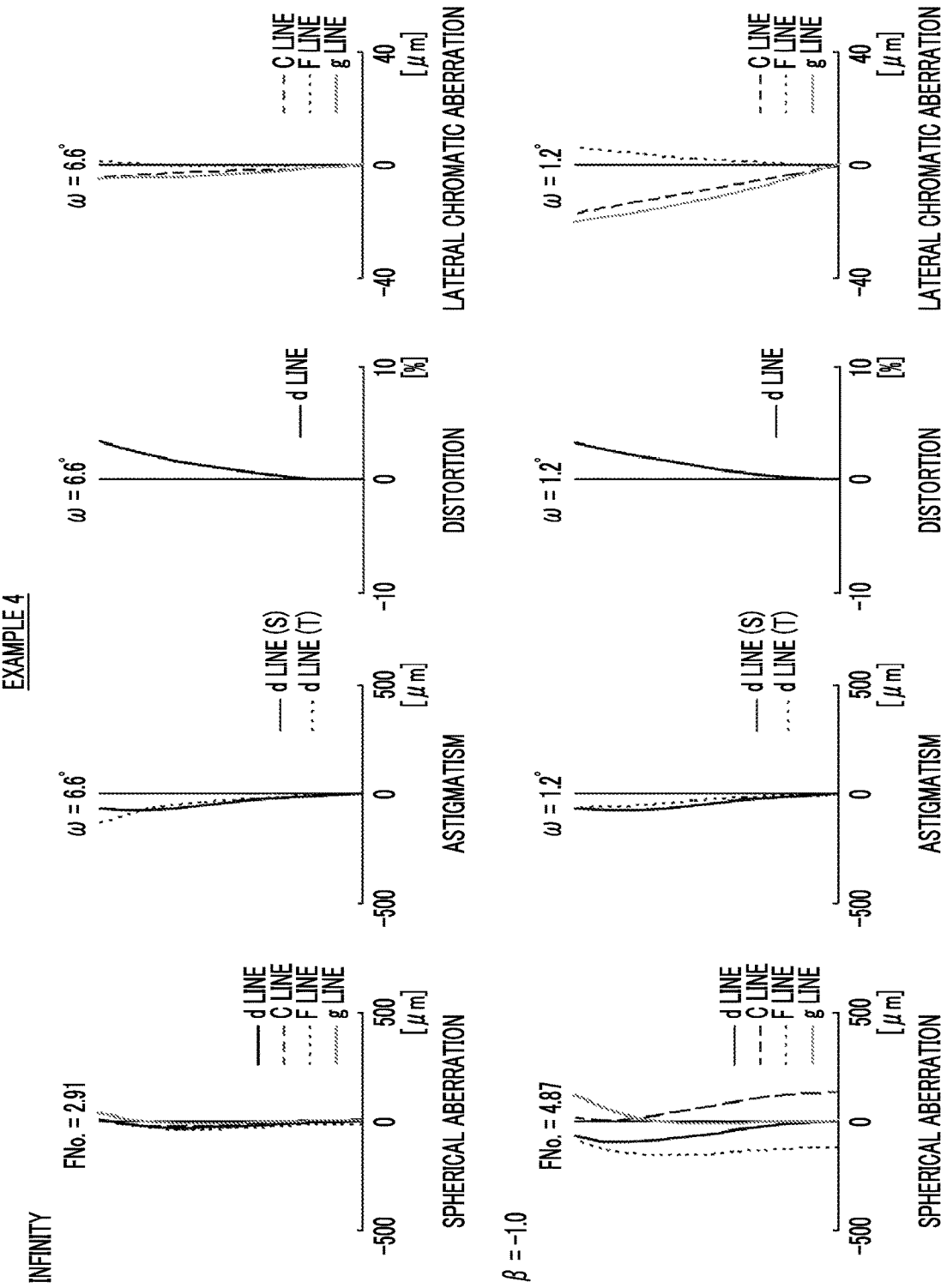
FIG. 12 is a diagram of aberrations of the imaging lens of Example 4 of the present invention, where the diagram includes spherical aberration diagram, astigmatism diagram, distortion diagram, and lateral chromatic aberration diagram, in order from the left side thereof.

Table 7 shows basic lens data of the imaging lens of Example 4, Table 8 shows specification and variable surface spacings, and FIGS. 12 and 20 show aberration diagrams thereof. Here, FIG. 20 shows aberrations when image blur correction is performed by moving the vibration-proof lens group G3b by 0.40 mm in a case where there is image blurring which causes the optical axis to be inclined by 0.3 degrees on the lower side labeled as "image blur correction".

TABLE 7

Example 4

| Si | Ri | Di | Ndj | vdj | θgFj |
|---|---|---|---|---|---|
| 1 | 385.00082 | 3.182 | 1.48749 | 70.24 | 0.53007 |
| 2 | −388.34694 | 0.300 | | | |
| 3 | 236.78623 | 4.424 | 1.43875 | 94.66 | 0.53402 |
| 4 | −183.24682 | 0.100 | | | |
| 5 | 114.33147 | 3.916 | 1.43875 | 94.66 | 0.53402 |
| 6 | 3046.45858 | 0.100 | | | |
| 7 | 79.48954 | 6.510 | 1.65412 | 39.68 | 0.57378 |
| 8 | −138.02026 | 1.400 | 1.77250 | 49.60 | 0.55212 |
| 9 | 179.44322 | DD[9] | | | |
| 10 | −256.37470 | 1.200 | 1.51680 | 64.20 | 0.53430 |
| 11 | 51.24453 | DD[11] | | | |
| 12 | 44.61272 | 3.514 | 1.43875 | 94.66 | 0.53402 |
| 13 | −176.19612 | 0.100 | | | |
| 14 | 49.02530 | 1.010 | 1.76182 | 26.52 | 0.61361 |
| 15 | 24.09456 | 4.400 | 1.49700 | 81.54 | 0.53748 |
| 16 | −3484.89243 | DD[16] | | | |
| 17(St) | ∞ | 2.000 | | | |
| 18 | −83.72966 | 1.000 | 1.85478 | 24.80 | 0.61232 |
| 19 | 32.40225 | 0.684 | | | |
| 20 | 49.41898 | 3.400 | 1.88300 | 40.76 | 0.56679 |
| 21 | −77.01013 | 1.800 | | | |
| 22 | −1228.80819 | 0.910 | 1.67300 | 38.15 | 0.57545 |
| 23 | 15.62500 | 3.460 | 2.00069 | 25.46 | 0.61364 |
| 24 | 22.88396 | 3.500 | | | |
| 25 | −70.17669 | 1.500 | 1.62041 | 60.29 | 0.54266 |
| 26 | 167.16281 | 4.439 | | | |
| 27 | 94.95810 | 5.615 | 1.85478 | 24.80 | 0.61232 |
| 28 | −44.35792 | 42.193 | | | |
| 29 | ∞ | 2.850 | 1.51680 | 64.20 | 0.53430 |
| 30 | ∞ | 1.000 | | | |

TABLE 8

Example 4

| | Infinity | β = −1.0 |
|---|---|---|
| f | 117.856 | |
| FNo. | 2.91 | 4.87 |
| 2ω(°) | 13.2 | 2.4 |
| DD[9] | 4.446 | 27.038 |
| DD[11] | 52.036 | 2.824 |
| DD[16] | 2.000 | 28.620 |

Example 5

Figure 13:
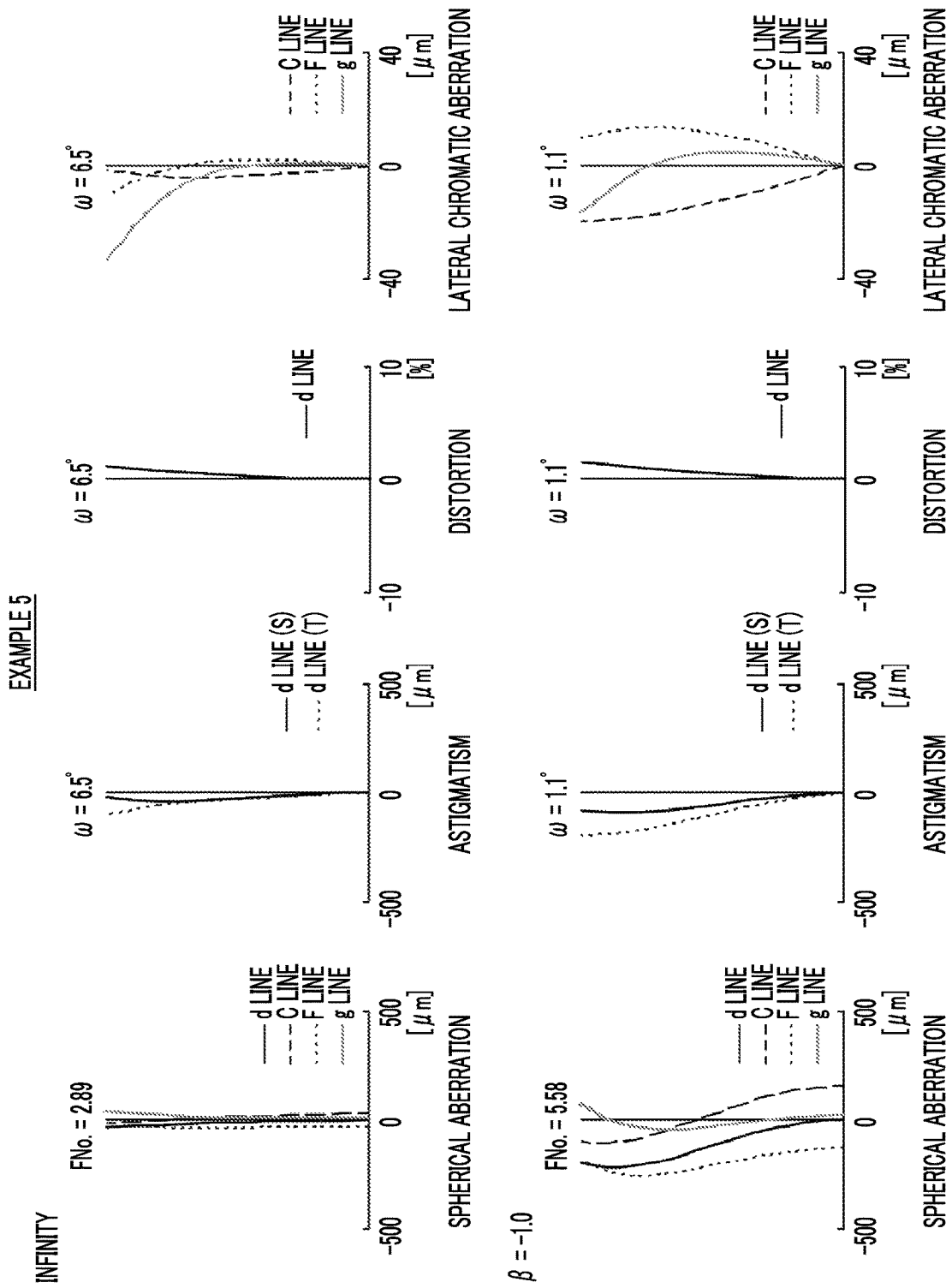
FIG. 13 is a diagram of aberrations of the imaging lens of Example 5 of the present invention, where the diagram includes spherical aberration diagram, astigmatism diagram, distortion diagram, and lateral chromatic aberration diagram, in order from the left side thereof.

FIG. 5 shows a lens configuration of an imaging lens of Example 5. The imaging lens of Example 5 is the same as that of Example 4 in terms of: the group configuration; the signs of the refractive powers of the first lens group G1 and the third lens group G3; the lens groups moving during focusing and the direction of movement thereof; the vibration-proof lens group that performs image blur correction; the lens groups that remain stationary during image blur correction; and the number of lenses constituting each lens group. Table 9 shows basic lens data of the imaging lens of Example 5, Table 10 shows specification and variable surface spacings, and FIGS. 13 and 21 show aberration diagrams thereof. Here, FIG. 21 shows aberrations when image blur correction is performed by moving the vibration-proof lens group G3b by 0.44 mm in a case where there is image blurring which causes the optical axis to be inclined by 0.3 degrees on the lower side labeled as "image blur correction".

TABLE 9

Example 5

| Si | Ri | Di | Ndj | vdj | θgFj |
|---|---|---|---|---|---|
| 1 | 238.12593 | 3.153 | 1.48749 | 70.24 | 0.53007 |
| 2 | −1054.24176 | 0.312 | | | |
| 3 | 356.37465 | 3.886 | 1.43875 | 94.66 | 0.53402 |
| 4 | −323.08873 | 0.408 | | | |
| 5 | 118.15055 | 4.135 | 1.43875 | 94.66 | 0.53402 |
| 6 | 382.03666 | 0.500 | | | |
| 7 | 68.69085 | 6.928 | 1.67300 | 38.15 | 0.57545 |
| 8 | −209.01258 | 2.311 | 1.80400 | 46.58 | 0.55730 |
| 9 | 151.61639 | DD[9] | | | |
| 10 | 790.87527 | 1.799 | 1.51742 | 52.43 | 0.55649 |
| 11 | 44.29003 | DD[11] | | | |
| 12 | 47.79939 | 4.016 | 1.43875 | 94.66 | 0.53402 |
| 13 | −269.20482 | 0.100 | | | |
| 14 | 38.61280 | 1.210 | 1.76182 | 26.52 | 0.61361 |
| 15 | 23.45793 | 5.014 | 1.49700 | 81.54 | 0.53748 |
| 16 | 1219.13484 | DD[16] | | | |
| 17(St) | ∞ | 1.700 | | | |
| 18 | 482.95618 | 1.000 | 1.85442 | 25.28 | 0.61342 |
| 19 | 33.90200 | 1.257 | | | |
| 20 | 82.80932 | 2.365 | 1.88300 | 40.76 | 0.56679 |
| 21 | −169.24757 | 3.000 | | | |
| 22 | −268.78374 | 1.110 | 1.67300 | 38.15 | 0.57545 |
| 23 | 16.11218 | 2.800 | 2.00100 | 29.13 | 0.59952 |
| 24 | 21.88858 | 3.500 | | | |
| 25 | −73.20078 | 1.520 | 1.62041 | 60.29 | 0.54266 |
| 26 | −614.77438 | 6.039 | | | |
| 27 | 57.16994 | 4.210 | 1.85553 | 23.52 | 0.61865 |
| 28 | −82.25431 | 38.529 | | | |
| 29 | ∞ | 2.850 | 1.51680 | 64.20 | 0.53430 |
| 30 | ∞ | 1.000 | | | |

TABLE 10

Example 5

| | Infinity | β = −1.0 |
|---|---|---|
| f | 123.279 | |
| FNo. | 2.89 | 5.58 |
| 2ω(°) | 13.0 | 2.2 |
| DD[9] | 4.942 | 26.314 |
| DD[11] | 55.300 | 6.868 |
| DD[16] | 4.100 | 31.159 |

Example 6

FIG. 6 shows a lens configuration of an imaging lens of Example 6. The imaging lens of Example 6 includes, in order from the object side: a first lens group G1 that has a positive refractive power; a second lens group G2; and a third lens group G3 that has a negative refractive power. The first lens group G1 includes, in order from the object side, four lenses L11 to L14. The second lens group G2 includes, in order from the object side, a first focus lens group F1, an aperture stop St, and a second focus lens group F2. The first focus lens group F1 includes two lenses L21 and L22, and the second focus lens group F2 includes, in order from the object side, three lenses L23 to L25. During focusing from the object at infinity to the close-range object, the first focus lens group F1 moves to the image side, the second focus lens group F2 moves to the object side, and the other lens groups remain stationary with respect to the image plane Sim.

The imaging lens is the same as that of Example 1 in terms of: the vibration-proof lens group that is provided in the third lens group G3 and performs image blur correction, the lens groups that remain stationary during image blur correction, and the number of lenses constituting each lens group within the third lens group G3.

Figure 14:
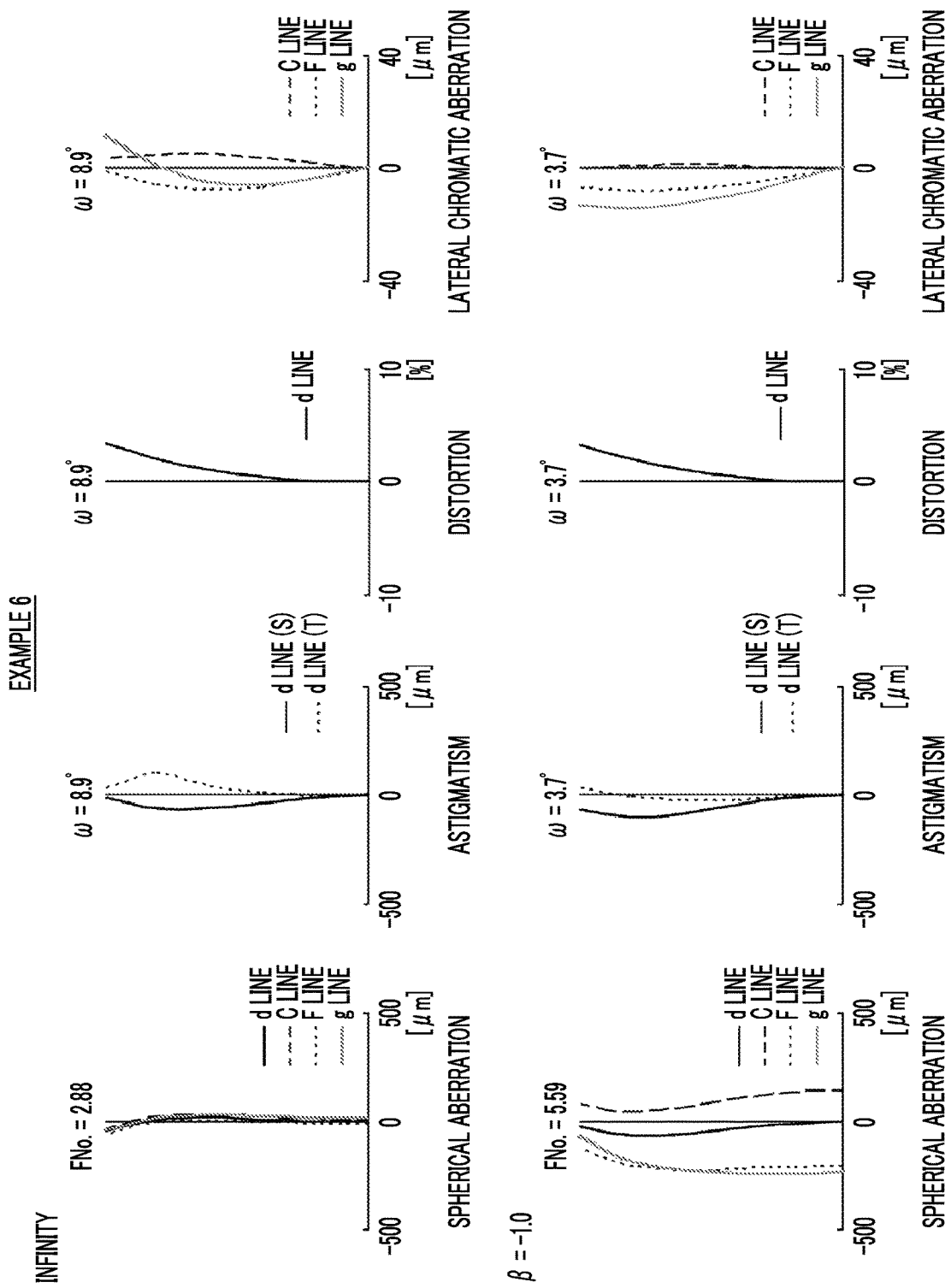
FIG. 14 is a diagram of aberrations of the imaging lens of Example 6 of the present invention, where the diagram includes spherical aberration diagram, astigmatism diagram, distortion diagram, and lateral chromatic aberration diagram, in order from the left side thereof.

Table 11 shows basic lens data of the imaging lens of Example 6, Table 12 shows specification and variable surface spacings, and FIGS. 14 and 22 show aberration diagrams thereof. Here, FIG. 22 shows aberrations when image blur correction is performed by moving the vibration-proof lens group G3b by 0.36 mm in a case where there is image blurring which causes the optical axis to be inclined by 0.3 degrees on the lower side labeled as "image blur correction".

TABLE 11

Example 6

| Si | Ri | Di | Ndj | vdj | θgFj |
|---|---|---|---|---|---|
| 1 | −42613.46503 | 1.810 | 2.00100 | 29.13 | 0.59952 |
| 2 | 150.43643 | 5.750 | 1.59522 | 67.73 | 0.54426 |
| 3 | −108.75660 | 0.200 | | | |
| 4 | 199.50954 | 3.750 | 1.53775 | 74.70 | 0.53936 |
| 5 | −281.05458 | 0.200 | | | |
| 6 | 65.14853 | 3.335 | 1.72916 | 54.68 | 0.54451 |
| 7 | 208.41730 | DD[7] | | | |
| 8 | −139.92608 | 2.510 | 1.92286 | 18.90 | 0.64960 |
| 9 | −79.38194 | 1.350 | 1.58313 | 59.37 | 0.54345 |
| 10 | 50.15777 | DD[10] | | | |
| 11(St) | ∞ | DD[11] | | | |
| 12 | 39.10458 | 3.044 | 1.43875 | 94.66 | 0.53402 |
| 13 | −153044.33907 | 0.100 | | | |
| 14 | 45.96229 | 1.090 | 1.74950 | 35.33 | 0.58189 |
| 15 | 21.09491 | 4.981 | 1.49700 | 81.54 | 0.53748 |
| 16 | −128.19535 | DD[16] | | | |
| 17 | −37.41229 | 1.060 | 1.92286 | 18.90 | 0.64960 |
| 18 | −77.84992 | 3.500 | 1.69680 | 55.53 | 0.54341 |
| 19 | −35.01559 | 2.000 | | | |
| 20 | −588.62842 | 1.030 | 1.71700 | 47.93 | 0.56062 |
| 21 | 16.84164 | 3.100 | 2.00069 | 25.46 | 0.61364 |
| 22 | 25.72039 | 3.000 | | | |
| 23 | −158.81605 | 1.500 | 1.65844 | 50.88 | 0.55612 |
| 24 | 126.96715 | 4.000 | | | |
| 25 | −40.69795 | 1.090 | 1.79952 | 42.22 | 0.56727 |
| 26 | 49.18899 | 6.000 | 2.00100 | 29.13 | 0.59952 |
| 27 | −38.64632 | 0.100 | | | |
| 28 | 45.72938 | 5.100 | 1.75500 | 52.32 | 0.54765 |
| 29 | −85.05582 | 4.000 | | | |
| 30 | −40.57140 | 1.150 | 1.92286 | 18.90 | 0.64960 |
| 31 | −133.57024 | 28.411 | | | |
| 32 | ∞ | 2.850 | 1.51680 | 64.20 | 0.53430 |
| 33 | ∞ | 1.000 | | | |

TABLE 12

Example 6

| | Infinity | β = −1.0 |
|---|---|---|
| f | 87.411 | |
| FNo. | 2.88 | 5.59 |
| 2ω(°) | 17.8 | 7.4 |

TABLE 12-continued

Example 6

| | Infinity | β = −1.0 |
|---|---|---|
| DD[7] | 4.506 | 27.337 |
| DD[10] | 29.108 | 6.277 |
| DD[11] | 32.235 | 3.161 |
| DD[16] | 3.257 | 32.331 |

Example 7

FIG. 7 shows a lens configuration of an imaging lens of Example 7. The imaging lens of Example 7 is different from that of Example 6 in that the third lens group G3 has a positive refractive power. However, The imaging lens is the same as that of Example 6 in terms of: the other group configuration; the sign of the refractive power of the first lens group G1; the lens groups moving during focusing and the direction of movement thereof; the vibration-proof lens group that performs image blur correction; the lens groups that remain stationary during image blur correction; and the number of lenses constituting each lens group.

Figure 15:
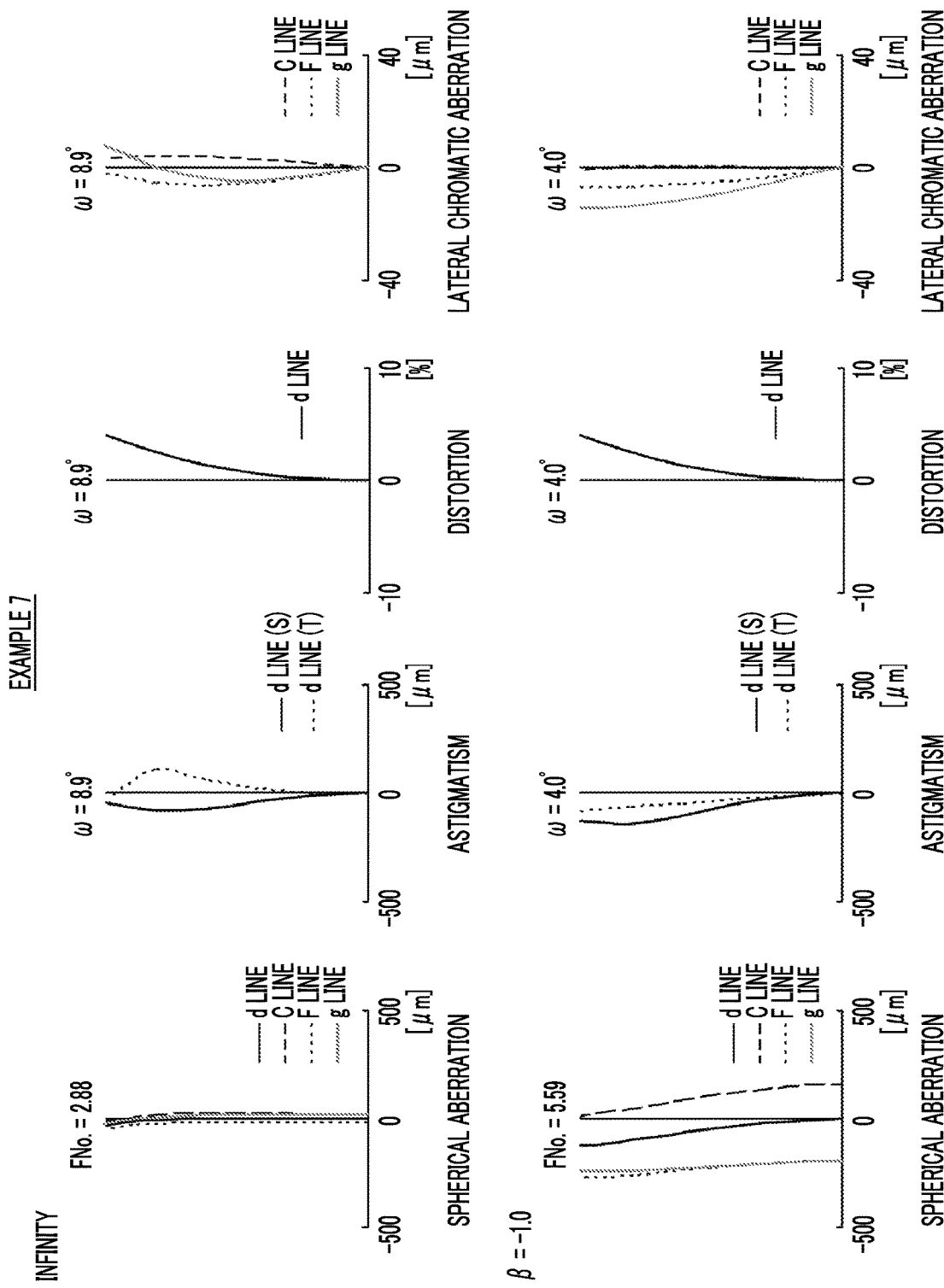
FIG. 15 is a diagram of aberrations of the imaging lens of Example 7 of the present invention, where the diagram includes spherical aberration diagram, astigmatism diagram, distortion diagram, and lateral chromatic aberration diagram, in order from the left side thereof.

Table 13 shows basic lens data of the imaging lens of Example 7, Table 14 shows specification and variable surface spacings, and FIGS. 15 and 23 show aberration diagrams thereof. Here, FIG. 23 shows aberrations when image blur correction is performed by moving the vibration-proof lens group G3b by 0.40 mm in a case where there is image blurring which causes the optical axis to be inclined by 0.3 degrees on the lower side labeled as "image blur correction".

TABLE 13

Example 7

| Si | Ri | Di | Ndj | vdj | θgFj |
|---|---|---|---|---|---|
| 1 | −223.26910 | 1.810 | 2.00100 | 29.13 | 0.59952 |
| 2 | 194.77789 | 7.000 | 1.58913 | 61.13 | 0.54067 |
| 3 | −85.96819 | 0.200 | | | |
| 4 | 250.28882 | 3.366 | 1.59522 | 67.73 | 0.54426 |
| 5 | −180.24201 | 0.200 | | | |
| 6 | 62.12450 | 3.592 | 1.72916 | 54.68 | 0.54451 |
| 7 | 276.34900 | DD[7] | | | |
| 8 | −139.23971 | 2.510 | 1.92286 | 18.90 | 0.64960 |
| 9 | −76.31727 | 1.350 | 1.58313 | 59.37 | 0.54345 |
| 10 | 50.53520 | DD[10] | | | |
| 11(St) | ∞ | DD[11] | | | |
| 12 | 40.70658 | 4.534 | 1.43875 | 94.66 | 0.53402 |
| 13 | −210.88503 | 0.100 | | | |
| 14 | 47.05501 | 1.090 | 1.74950 | 35.33 | 0.58189 |
| 15 | 21.36234 | 4.640 | 1.49700 | 81.54 | 0.53748 |
| 16 | −654.93715 | DD[16] | | | |
| 17 | −29.98759 | 1.010 | 1.92286 | 18.90 | 0.64960 |
| 18 | −44.49849 | 3.400 | 1.69680 | 55.53 | 0.54341 |
| 19 | −29.92767 | 2.500 | | | |
| 20 | 100.62261 | 1.030 | 1.71700 | 47.93 | 0.56062 |
| 21 | 15.62500 | 3.100 | 2.00069 | 25.46 | 0.61364 |
| 22 | 23.02461 | 3.500 | | | |
| 23 | −233.50476 | 1.500 | 1.65844 | 50.88 | 0.55612 |
| 24 | 61.84410 | 4.000 | | | |
| 25 | −38.53493 | 1.090 | 1.79952 | 42.22 | 0.56727 |
| 26 | 162.34147 | 5.000 | 2.00100 | 29.13 | 0.59952 |
| 27 | −45.67021 | 0.100 | | | |
| 28 | 54.54459 | 5.000 | 1.75500 | 52.32 | 0.54765 |
| 29 | −45.02371 | 4.000 | | | |
| 30 | −31.38342 | 1.150 | 1.92286 | 18.90 | 0.64960 |
| 31 | −53.47173 | 28.881 | | | |
| 32 | ∞ | 2.850 | 1.51680 | 64.20 | 0.53430 |
| 33 | ∞ | 1.000 | | | |

TABLE 14

| | Example 7 | |
|---|---|---|
| | Infinity | β = −1.0 |
| f | 87.420 | |
| FNo. | 2.88 | 5.59 |
| 2ω(°) | 17.8 | 8.0 |
| DD[7] | 4.634 | 25.690 |
| DD[10] | 27.256 | 6.200 |
| DD[11] | 33.344 | 2.905 |
| DD[16] | 2.200 | 32.639 |

Example 8

FIG. 8 shows a lens configuration of an imaging lens of Example 8. The imaging lens of Example 8 includes, in order from the object side: a first lens group G1 that has a positive refractive power; a second lens group G2; and a third lens group G3 that has a negative refractive power. The first lens group G1 includes, in order from the object side, five lenses L11 to L15. The second lens group G2 includes, in order from the object side, a first focus lens group F1, an aperture stop St, two lenses L22 and L23, a second focus lens group F2. The first focus lens group F1 includes only a lens L21, and the second focus lens group F2 includes, in order from the object side, three lenses L24 to L26. The lenses L22 and L23 remain stationary with respect to the image plane Sim during focusing. During focusing from the object at infinity to the close-range object, the first focus lens group F1 moves to the image side, the second focus lens group F2 moves to the object side, and the other lens groups remain stationary with respect to the image plane Sim.

The imaging lens is the same as that of Example 1 in terms of: the vibration-proof lens group that is provided in the third lens group G3 and performs image blur correction, the lens groups that remain stationary during image blur correction, and the number of lenses constituting each lens group within the third lens group G3.

Figure 16:
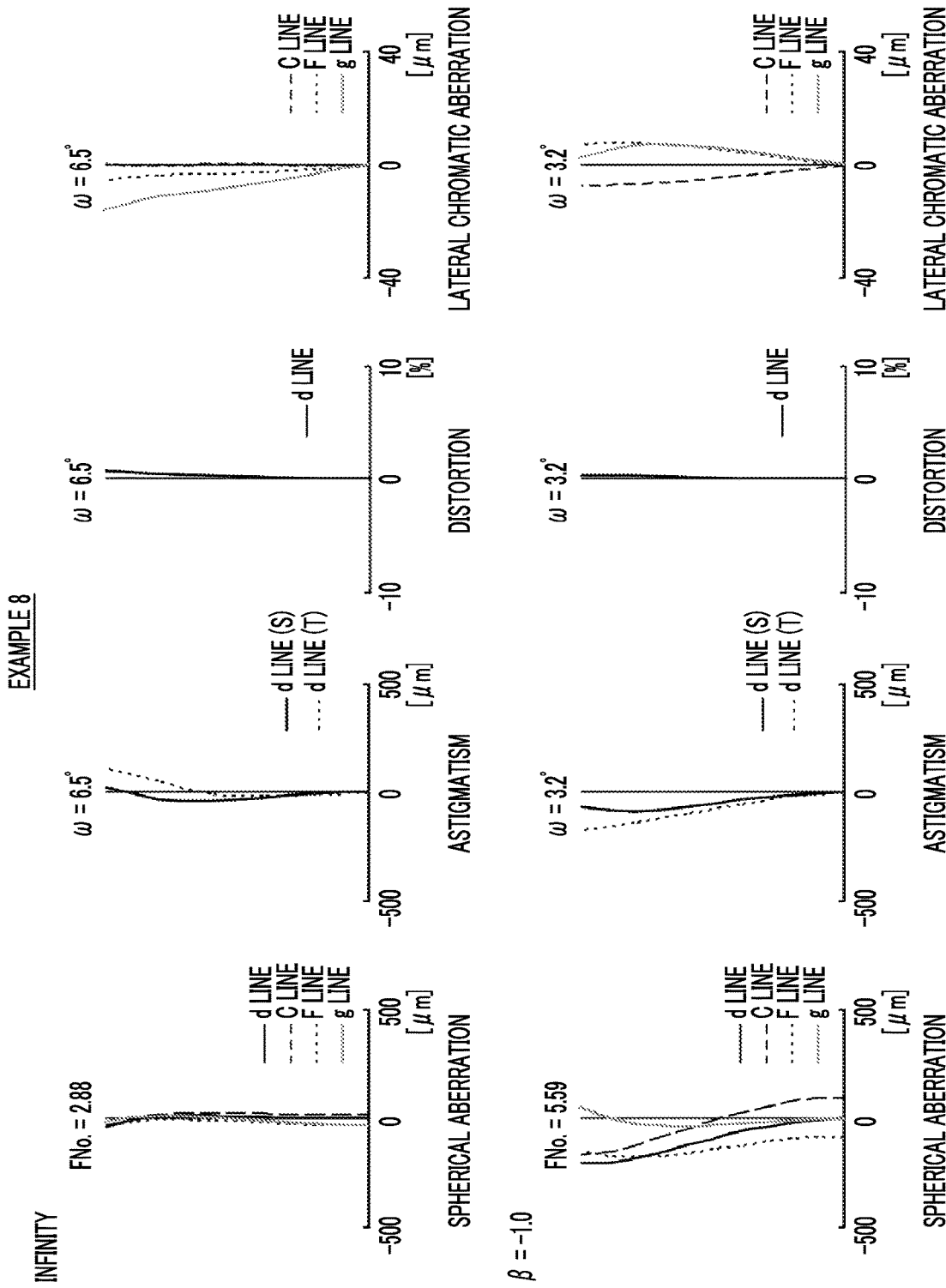
FIG. 16 is a diagram of aberrations of the imaging lens of Example 8 of the present invention, where the diagram includes spherical aberration diagram, astigmatism diagram, distortion diagram, and lateral chromatic aberration diagram, in order from the left side thereof.

Table 15 shows basic lens data of the imaging lens of Example 8, Table 16 shows specification and variable surface spacings, and FIGS. 16 and 24 show aberration diagrams thereof. Here, FIG. 24 shows aberrations when image blur correction is performed by moving the vibration-proof lens group G3b by 0.44 mm in a case where there is image blurring which causes the optical axis to be inclined by 0.3 degrees on the lower side labeled as "image blur correction".

TABLE 15

| | Example 8 | | | | |
|---|---|---|---|---|---|
| Si | Ri | Di | Ndj | vdj | θgFj |
| 1 | 322.62989 | 3.342 | 1.63980 | 34.47 | 0.59233 |
| 2 | −232.97033 | 0.312 | | | |
| 3 | 181.56084 | 2.984 | 1.43875 | 94.66 | 0.53402 |
| 4 | −5167.85812 | 0.106 | | | |
| 5 | 85.38361 | 3.760 | 1.43875 | 94.66 | 0.53402 |
| 6 | 335.57765 | 0.253 | | | |
| 7 | 100.76426 | 4.080 | 1.76200 | 40.10 | 0.57655 |
| 8 | −444.11595 | 1.400 | 2.00100 | 29.13 | 0.59952 |
| 9 | 285.36259 | DD[9] | | | |

TABLE 15-continued

| | Example 8 | | | | |
|---|---|---|---|---|---|
| Si | Ri | Di | Ndj | vdj | θgFj |
| 10 | −302.45984 | 1.206 | 1.51633 | 64.14 | 0.53531 |
| 11 | 47.51145 | DD[11] | | | |
| 12(St) | ∞ | 2.000 | | | |
| 13 | 4237.25725 | 2.510 | 1.49700 | 81.54 | 0.53748 |
| 14 | −113.27025 | 0.800 | 1.76200 | 40.10 | 0.57655 |
| 15 | −882.26030 | DD[15] | | | |
| 16 | 38.68510 | 3.992 | 1.43875 | 94.66 | 0.53402 |
| 17 | −325.16376 | 0.100 | | | |
| 18 | 45.93988 | 1.011 | 1.74950 | 35.33 | 0.58189 |
| 19 | 21.19752 | 5.149 | 1.49700 | 81.54 | 0.53748 |
| 20 | −5376.62543 | DD[20] | | | |
| 21 | 282.05963 | 1.059 | 1.84666 | 23.78 | 0.62054 |
| 22 | 30.29178 | 1.601 | | | |
| 23 | 41.98925 | 3.883 | 1.69680 | 55.53 | 0.54341 |
| 24 | −205.20952 | 3.040 | | | |
| 25 | 358.55402 | 0.960 | 1.75500 | 52.32 | 0.54765 |
| 26 | 16.97820 | 2.826 | 2.00100 | 29.13 | 0.59952 |
| 27 | 25.00983 | 3.200 | | | |
| 28 | −85.00000 | 1.500 | 1.62041 | 60.29 | 0.54266 |
| 29 | 165.00000 | 4.512 | | | |
| 30 | −55.76745 | 0.910 | 1.59522 | 67.73 | 0.54426 |
| 31 | 58.04073 | 4.500 | 2.00069 | 25.46 | 0.61364 |
| 32 | −59.72944 | 2.072 | | | |
| 33 | 37.74873 | 6.500 | 1.69680 | 55.53 | 0.54341 |
| 34 | −61.19939 | 4.000 | | | |
| 35 | −50.50293 | 1.250 | 2.00100 | 29.13 | 0.59952 |
| 36 | 422.78645 | 29.048 | | | |
| 37 | ∞ | 2.850 | 1.51680 | 64.20 | 0.53430 |
| 38 | ∞ | 1.000 | | | |

TABLE 16

| | Example 8 | |
|---|---|---|
| | Infinity | β = −1.0 |
| f | 123.329 | |
| FNo. | 2.88 | 5.59 |
| 2ω(°) | 13.0 | 6.4 |
| DD[9] | 4.471 | 25.438 |
| DD[11] | 28.674 | 7.707 |
| DD[15] | 30.516 | 3.143 |
| DD[20] | 2.200 | 29.573 |

Table 17 shows values corresponding to Conditional Expressions (1) to (9) of the imaging lenses of Examples 1 to 8. In Table 17, in the places of the values corresponding to Conditional Expression (5), the reference signs of the corresponding lenses are noted in parentheses. The values shown in Table 17 are based on the d line.

TABLE 17

Values of Conditional Expressions

| | Example 1 | Example 2 | Example 3 | Example 4 | Example 5 | Example 6 | Example 7 | Example 8 |
|---|---|---|---|---|---|---|---|---|
| (1) vF1n | 64.14 | 58.90 | 70.24 | 64.20 | 52.43 | 59.37 | 59.37 | 64.14 |
| (2) vF2p | 94.66 | 94.66 | 94.66 | 94.66 | 94.66 | 94.66 | 94.66 | 94.66 |
| (3) fG1/f | 0.60 | 0.55 | 0.62 | 0.62 | 0.69 | 0.76 | 0.73 | 0.56 |
| (4) \|mF2/mF1\| | 1.28 | 1.85 | 1.04 | 1.81 | 1.27 | 1.27 | 1.45 | 1.31 |
| (5) vG1p | 94.66 (L12) | 94.66 (L12) | 65.44 (L12) | 70.24 (L11) | 70.24 (L11) | 67.73 (L12) | 61.13 (L12) | 94.66 (L12) |
| | 94.66 (L13) | 94.66 (L13) | 94.66 (L13) | 94.66 (L12) | 94.66 (L12) | 74.70 (L13) | 67.73 (L13) | 94.66 (L13) |
| | — | — | — | 94.66 (L13) | 94.66 (L13) | — | — | — |
| (6) \|fF1/f\| | 0.65 | 0.59 | 0.71 | 0.70 | 0.74 | 0.82 | 0.83 | 0.64 |
| (7) fF2/f | 0.48 | 0.51 | 0.48 | 0.50 | 0.43 | 0.60 | 0.65 | 0.47 |
| (8) \|fF1/fF2\| | 1.35 | 1.15 | 1.49 | 1.40 | 1.71 | 1.37 | 1.28 | 1.36 |
| (9) TL/f | 1.41 | 1.39 | 1.43 | 1.38 | 1.36 | 1.89 | 1.90 | 1.40 |

As can be seen from the above data, the imaging lenses of Examples 1 to 8 each are capable of a high imaging magnification of the equal magnification and each have a small F number of 2.91 or less. In addition, fluctuations in aberrations during focusing are suppressed by reducing the weights of the focus lens groups. As a result, each aberration is satisfactorily corrected, and thereby high optical performance is achieved. The imaging lenses of Examples 1 to 8 are suitable for macro lenses in a range of, for example, the middle telephoto to the telephoto.

Figure 25A:
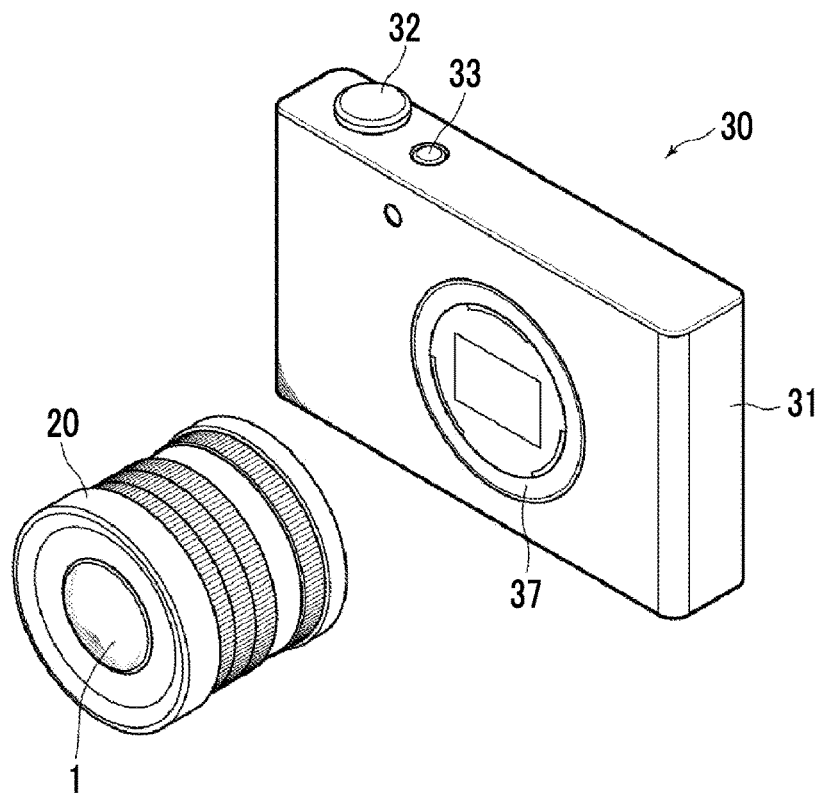
FIG. 25A is a perspective view of the front side of an imaging apparatus according to an embodiment of the present invention.
Figure 25B:
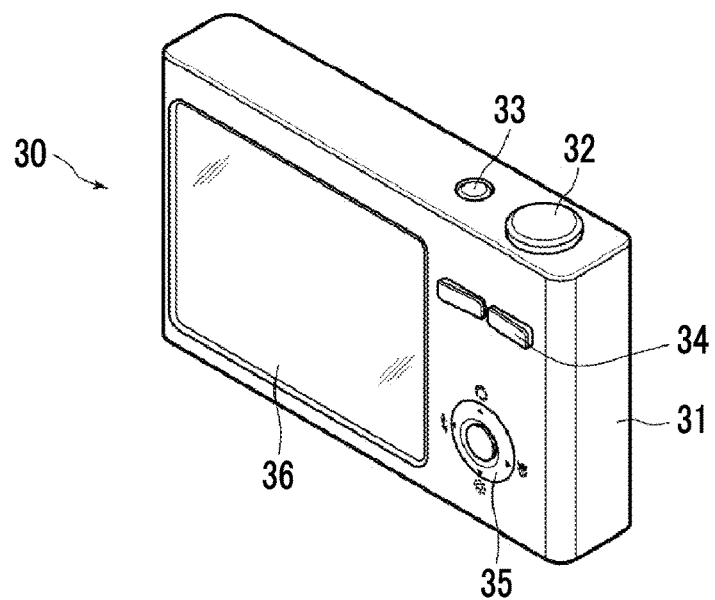
FIG. 25B is a perspective view of the rear side of an imaging apparatus according to the embodiment of the present invention.

Next, an imaging apparatus according to an embodiment of the present invention will be described. FIGS. 25A and 25B are external views of a camera 30 which is the imaging apparatus according to the embodiment of the present invention. FIG. 25A is a perspective view of the camera 30 viewed from the front side, and FIG. 25B is a perspective view of the camera 30 viewed from the rear side. The camera 30 is a single-lens digital camera on which an interchangeable lens 20 is detachably mounted and which has no reflex finder. The interchangeable lens 20 is configured such that the imaging lens 1 according to the embodiment of the present invention is housed in a barrel.

The camera 30 comprises a camera body 31, and a shutter button 32 and a power button 33 are provided on an upper surface of the camera body 31. Further, operation sections 34 and 35 and a display section 36 are provided on a rear surface of the camera body 31. The display section 36 is for displaying a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a moving image by pressing the shutter button 32, and is able to store image data, which is obtained through imaging, in the storage medium.

The present invention has been hitherto described through embodiments and examples, but the present invention is not limited to the above-mentioned embodiments and examples, and may be modified into various forms. For example, values such as the radius of curvature, the surface spacing, the refractive index, and the Abbe number of each lens are not limited to the values shown in the numerical examples, and different values may be used therefor.

Further, the imaging apparatus of the present invention is also not limited to the above-mentioned configurations. For example, the present invention may be applied to a single-lens reflex camera, a film camera, a video camera, and the like.

What is claimed is:

1. An imaging lens consisting of, in order from an object side:
    a first lens group that has a positive refractive power;
    a second lens group; and
    a third lens group,
    wherein the second lens group has a first focus lens group, which is disposed to be closest to the object side of the second lens group and has a negative refractive power, and a second focus lens group which is disposed to be closest to an image side of the second lens group and has a positive refractive power,
    wherein during focusing from an object at infinity to a close-range object, the first focus lens group and the second focus lens group are moved respectively by changing a mutual spacing therebetween in a direction of an optical axis, and a lens group other than the first and second focus lens groups remains stationary with respect to an image plane,
    wherein the first lens group has at least two positive lenses and at least one negative lens,
    wherein the first focus lens group consists of two or less lenses including one negative lens,
    wherein the second focus lens group has at least one positive lens, and
    wherein all Conditional Expressions (1) to (3) are satisfied, $$45 < vF1n \tag{1},$$

$$65 < vF2p \tag{2, and}$$

$$0.4 < fG1/f < 0.85 \tag{3},$$

where vF1n is a maximum value of an Abbe number of the negative lens within the first focus lens group at a d line, vF2p is a maximum value of an Abbe number of the positive lens within the second focus lens group at the d line, fG1 is a focal length of the first lens group, and f is a focal length of the imaging lens during focusing on the object at infinity.

2. The imaging lens according to claim 1, wherein Conditional Expression (4) is satisfied, $$0.6<|mF2/mF1|<2.2 \qquad (4),$$

where mF2 is a difference between positions of the second focus lens group in the direction of the optical axis during focusing on the object at infinity and during focusing on a closest object, and mF1 is a difference between positions of the first focus lens group in the direction of the optical axis during focusing on the object at infinity and during focusing on the closest object.

3. The imaging lens according to claim 1, wherein the second focus lens group has at least one positive lens and at least one negative lens.

4. The imaging lens according to claim 1, wherein the second focus lens group consists of two positive lenses and one negative lens.

5. The imaging lens according to claim 1, wherein the first lens group consists of five or less lenses including at least three positive lenses and at least one negative lens.

6. The imaging lens according to claim 1, wherein the first lens group has at least two positive lenses which satisfy Conditional Expression (5), $$60<\nu G1p \qquad (5),$$

where νG1p is an Abbe number of the positive lens within the first lens group at the d line.

7. The imaging lens according to claim 1, wherein during focusing from the object at infinity to the close-range object, the first focus lens group and the second focus lens group move in directions opposite to each other in any case.

8. The imaging lens according to claim 1, wherein the third lens group has a vibration-proof lens group, which has a negative refractive power and performs image blur correction by moving in a direction perpendicular to the optical axis, and a stationary lens group which has a positive refractive power and does not move during the image blur correction.

9. The imaging lens according to claim 8, wherein the vibration-proof lens group consists of one positive lens and two negative lenses.

10. The imaging lens according to claim 1, wherein the first focus lens group consists of one single lens which has a negative refractive power.

11. The imaging lens according to claim 1, wherein an aperture stop is disposed between the first focus lens group and the second focus lens group.

12. The imaging lens according to claim 1, wherein the third lens group has a negative refractive power.

13. The imaging lens according to claim 1, wherein Conditional Expression (6) is satisfied, $$0.4<|fF1/f|<1.2 \qquad (6),$$

where fF1 is a focal length of the first focus lens group.

14. The imaging lens according to claim 1, wherein Conditional Expression (7) is satisfied, $$0.3<fF2/f<0.9 \qquad (7),$$

where fF2 is a focal length of the second focus lens group.

15. The imaging lens according to claim 1, wherein Conditional Expression (8) is satisfied, $$0.95<|fF1/fF2|<2.1 \qquad (8),$$

where fF1 is a focal length of the first focus lens group, and fF2 is a focal length of the second focus lens group.

16. The imaging lens according to claim 1, wherein Conditional Expression (9) is satisfied, $$1.1<TL/f<2.3 \qquad (9),$$

where TL is a sum of a back focus as an air conversion distance and a distance on the optical axis from a lens surface closest to the object side to a lens surface closest to the image side.

17. The imaging lens according to claim 1, wherein Conditional Expression (1-1) is satisfied $$50<\nu F1n<100 \qquad (1\text{-}1).$$

18. The imaging lens according to claim 1, wherein Conditional Expression (1-2) is satisfied $$55<\nu F1n<85 \qquad (1\text{-}2).$$

19. The imaging lens according to claim 1, wherein Conditional Expression (3-1) is satisfied $$0.45<fG1/f<0.8 \qquad (3\text{-}1).$$

20. An imaging apparatus comprising the imaging lens according to claim 1.

* * * * *